US012782836B2

(12) United States Patent
Watanabe et al.

(10) Patent No.: US 12,782,836 B2
(45) Date of Patent: Nov. 3, 2026

(54) ELECTROPHOTOGRAPHIC MEMBER, METHOD FOR PRODUCING SAME, PROCESS CARTRIDGE, AND ELECTROPHOTOGRAPHIC IMAGE-FORMING DEVICE

(71) Applicant: CANON KABUSHIKI KAISHA, Tokyo (JP)

(72) Inventors: Masahiro Watanabe, Shizuoka (JP); Kana Sato, Shizuoka (JP); Tetsuo Hino, Kanagawa (JP); Ryo Ogawa, Kanagawa (JP); Takayuki Hiratani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 503 days.

(21) Appl. No.: 18/490,462

(22) Filed: Oct. 19, 2023

(65) Prior Publication Data

US 2024/0053699 A1 Feb. 15, 2024

Related U.S. Application Data

(63) Continuation of application No. PCT/JP2022/017332, filed on Apr. 8, 2022.

(30) Foreign Application Priority Data

Apr. 26, 2021 (JP) ................................ 2021-074334
Sep. 30, 2021 (JP) ................................ 2021-161240

(Continued)

(51) Int. Cl.
*G03G 15/08* (2006.01)
*G03G 5/147* (2006.01)

(52) U.S. Cl.
CPC ..... *G03G 5/14743* (2013.01); *G03G 15/0868* (2013.01)

(58) Field of Classification Search
CPC ....................... G03G 15/0216; G03G 15/0233
See application file for complete search history.

(56) References Cited

U.S. PATENT DOCUMENTS 7,727,134 B2 6/2010 Nakamura
8,176,632 B2 5/2012 Kawamura
(Continued)

FOREIGN PATENT DOCUMENTS

CN 111752124 A 10/2020
JP 9-34216 A 2/1997
(Continued)

OTHER PUBLICATIONS

Translation of JP 2017-072833.*
Nobuyuki Otsu, IEEE Transactions on Systems, Man, and Cybernetics, vol. SMC-9, No. 1, Jan. 1979, pp. 62-66.

*Primary Examiner* — Peter L Vajda
(74) *Attorney, Agent, or Firm* — VENABLE LLP

(57) ABSTRACT

An electrophotographic member comprising: a mandrel; and an elastic layer on an outer periphery of the mandrel, the elastic layer containing a polyurethane elastomer including a matrix and domains dispersed in the matrix, a parameter A and a parameter B satisfying a relationship of A<B, where the parameter A indicates a viscoelastic term of each of the plurality of domains and the parameter B indicates a viscoelastic term of the matrix, the elastic layer having a microrubber hardness at a temperature of 23° C. of 20 to 50, and in an indentation test of the elastic layer with a nanoindenter at 23° C., in which a Vickers indenter is indented into the elastic layer at a load speed of 10 mN/30 sec and is maintained at a load of 10 mN for 60 seconds, followed by (Continued)

unloading, strain after 5 seconds from the unloading being 1 μm or less.

11 Claims, 7 Drawing Sheets

(30) Foreign Application Priority Data

| | | |
|---|---|---|
| Jan. 28, 2022 | (JP) | 2022-011865 |
| Mar. 18, 2022 | (JP) | 2022-044046 |

(56) References Cited

U.S. PATENT DOCUMENTS

| | | | | |
|---|---|---|---|---|
| 8,628,854 | B2 | 1/2014 | Yamauchi | |
| 8,745,870 | B2 | 6/2014 | Kawamura | |
| 8,771,818 | B2 | 7/2014 | Nishioka | |
| 8,852,743 | B2 | 10/2014 | Kikuchi | |
| 9,146,482 | B2 | 9/2015 | Watanabe | |
| 9,274,442 | B2 | 3/2016 | Sato | |
| 9,442,451 | B2 | 9/2016 | Yamauchi et al. | |
| 9,541,854 | B2 | 1/2017 | Kikuchi | |
| 9,547,250 | B2 | 1/2017 | Kikuchi | |
| 9,551,949 | B2 | 1/2017 | Yamauchi | |
| 9,599,913 | B2 | 3/2017 | Nishioka | |
| 9,599,914 | B2 | 3/2017 | Uematsu | |
| 9,651,888 | B2 | 5/2017 | Muranaka | |
| 9,665,029 | B2 | 5/2017 | Hino | |
| 9,958,802 | B2 | 5/2018 | Kikuchi | |
| 10,018,927 | B2 | 7/2018 | Yamada | |
| 10,025,216 | B2 | 7/2018 | Uematsu | |
| 11,112,748 | B2 | 9/2021 | Yamada | |
| 11,169,454 | B2 | 11/2021 | Nishioka | |
| 11,175,602 | B2 | 11/2021 | Nishioka | |
| 11,307,509 | B2 | 4/2022 | Hino | |
| 11,397,388 | B2 | 7/2022 | Nishioka | |
| 11,556,073 | B2 | 1/2023 | Fushimoto | |
| 11,586,121 | B2 | 2/2023 | Yamada | |
| 2017/0139346 | A1 | 5/2017 | Ishida et al. | |
| 2019/0018362 | A1 * | 1/2019 | Morishita | G03G 15/0818 |
| 2020/0310264 | A1 | 10/2020 | Kurachi | |
| 2022/0011684 | A1 | 1/2022 | Nishioka | |
| 2024/0043685 | A1 | 2/2024 | Hiratani et al. | |

FOREIGN PATENT DOCUMENTS

| | | | | |
|---|---|---|---|---|
| JP | 2003-49023 | A | 2/2003 | |
| JP | 2004-133287 | A | 4/2004 | |
| JP | 2012-103581 | A | 5/2012 | |
| JP | 2015-81278 | A | 4/2015 | |
| JP | 2017-072833 | * | 4/2017 | G03G 15/00 |
| JP | 2020-84152 | A | 6/2020 | |
| JP | 2020-166259 | A | 10/2020 | |
| WO | 2021/075532 | A1 | 4/2021 | |

* cited by examiner

ELECTROPHOTOGRAPHIC MEMBER, METHOD FOR PRODUCING SAME, PROCESS CARTRIDGE, AND ELECTROPHOTOGRAPHIC IMAGE-FORMING DEVICE

CROSS-REFERENCE TO RELATED APPLICATIONS

This application is a Continuation of International Patent Application No. PCT/JP2022/017332, filed Apr. 8, 2022, which claims the benefit of Japanese Patent Application No. 2021-074334, filed Apr. 26, 2021, Japanese Patent Application No. 2021-161240, filed Sep. 30, 2021, Japanese Patent Application No. 2022-011865, filed Jan. 28, 2022, and Japanese Patent Application No. 2022-044046, filed Mar. 18, 2022, all of which are hereby incorporated by reference herein in their entirety.

BACKGROUND

Technical Field

The present disclosure is directed to an electrophotographic member used in an electrophotographic image forming apparatus (hereinafter sometimes simply referred to as "image forming apparatus"), such as a copying machine or a printer using an electrophotographic system, and a method of producing the electrophotographic member. The present disclosure is also directed to a process cartridge and an electrophotographic image forming apparatus.

Description of the Related Art

An image forming apparatus adopting an electrophotographic system (a copying machine, a fax machine, a printer, or the like using an electrophotographic system) mainly includes an electrophotographic photosensitive member (hereinafter sometimes referred to as "photosensitive member"), a charging device, an exposure device, a developing device, a transfer device, and a fixing device.

In the image forming apparatus, the photosensitive member is first charged by a charging member (hereinafter sometimes referred to as "charging roller") and then exposed. Thus, an electrostatic latent image is formed on the photosensitive member. In addition, toner in a toner container is applied onto a toner carrying member (hereinafter sometimes referred to as "developing roller") by a toner regulating member, and is conveyed to a developing region by the developing roller. Then, the electrostatic latent image on the photosensitive member is developed in an abutment portion between the photosensitive member and the developing roller with the toner conveyed to the developing region. After that, the toner on the photosensitive member is transferred to a recording sheet by transfer means and fixed with heat and a pressure. The toner remaining on the photosensitive member is removed by a cleaning member.

As a material for an elastic layer of each of such charging roller and developing roller, a silicone rubber, an acrylonitrile-butadiene rubber, an epichlorohydrin rubber, and a urethane elastomer have hitherto been used. Of those materials, the urethane elastomer has satisfactory wear resistance, and hence is suitably used as the material for the elastic layer.

However, the urethane elastomer is generally liable to have compression set. Thus, when a specific site of a developing roller including an elastic layer containing a urethane elastomer is brought into abutment against a toner regulating member over a long period of time and the specific site is deformed, the deformation is not easily recovered. When the developing roller in which the specific site is deformed is subjected to image formation, an electrophotographic image to be obtained may have a streak-like defect at a position corresponding to the deformed site. Similarly, also in a charging roller including an elastic layer containing a urethane elastomer, a charging fault due to deformation that has occurred in a specific site of the charging roller occurs, and an electrophotographic image to be obtained may have a defect. When the hardness of the urethane elastomer is lower, the compression set tends to be increased, and the above-mentioned defect is more liable to occur.

In Japanese Patent Application Laid-Open No. H09-34216, there is a disclosure of an electroconductive roller including an electroconductive elastic layer formed of a urethane elastomer obtained by allowing a polyisocyanate formed of a trimer of hexamethylene diisocyanate, a biuret form thereof, or a mixture thereof and a polyol containing high-molecular weight polypropylene polyol as a main component to react with each other at an isocyanate index of from 80 to 120. In Japanese Patent Application Laid-Open No. H09-34216, there is a disclosure that the electroconductive roller excellent in recoverability from deformation caused by pressure contact with a photosensitive member and pressure contact with the roller or a blade is obtained because the electroconductive elastic layer reduces the permanent set of the roller.

The inventors have made investigations on the electroconductive roller according to Japanese Patent Application Laid-Open No. H09-34216. As a result, the inventors have found that the urethane elastomer according to Japanese Patent Application Laid-Open No. H09-34216 still has room for improvement as a constituent material for the elastic layer of each of the developing roller and the charging roller to be used in a high-speed image forming apparatus.

At least one aspect of the present disclosure is directed to providing an electrophotographic member that has low hardness and rapidly recovers from deformation. At least one aspect of the present disclosure is directed to providing a method of producing an electrophotographic member that has low hardness and is excellent in recoverability from deformation. Further, at least one aspect of the present disclosure is directed to providing a process cartridge that contributes to the formation of a high-quality electrophotographic image. Furthermore, at least one aspect of the present disclosure is directed to providing an electrophotographic image forming apparatus capable of forming a high-quality electrophotographic image.

SUMMARY

According to one aspect of the present disclosure, there is provided an electrophotographic member including: a mandrel; and an elastic layer on an outer periphery of the mandrel, the elastic layer containing a polyurethane elastomer including a matrix and a plurality of domains dispersed in the matrix, a parameter A and a parameter B satisfying a relationship of $A<B$, where the parameter A indicates a viscoelastic term of each of the plurality of domains and the parameter B indicates a viscoelastic term of the matrix, the parameters A and B being measured in a viscoelastic image of a cross-section of the elastic layer in a thickness direction with a scanning probe microscope, the elastic layer having a microrubber hardness at a temperature of 23° C. of 20 or more and 50 or less, and in an indentation test of the elastic layer with a nanoindenter at 23° C., in which a Vickers indenter is indented into the elastic layer at a load speed of 10 mN/30 sec and is maintained at a load of 10 mN for 60 seconds, followed by unloading, strain after 5 seconds from the unloading being 1 μm or less.

According to another aspect of the present disclosure, there is provided a process cartridge configured to be detachably attachable to an image forming apparatus, the process cartridge including the electrophotographic member.

According to still another aspect of the present disclosure, there is provided an electrophotographic image forming apparatus including the electrophotographic member.

According to yet still another aspect of the present disclosure, there is provided a method of producing the electrophotographic member, the method including the steps of: (i) allowing a first polyether having at least two isocyanate groups and a first polycarbonate polyol having at least two hydroxy groups to react with each other to provide a urethane reactive emulsifier having at least two hydroxy groups; (ii) providing a dispersion in which liquid droplets each containing at least part of the urethane reactive emulsifier are dispersed in a second polycarbonate polyol; (iii) providing a mixture for forming an elastic layer containing the dispersion and a polyisocyanate having at least two isocyanate groups; and (iv) allowing the urethane reactive emulsifier, the second polycarbonate polyol, and the polyisocyanate in the mixture for forming an elastic layer to react with each other on a surface of the mandrel, to thereby provide the elastic layer.

Further features of the present invention will become apparent from the following description of exemplary embodiments with reference to the attached drawings.

DESCRIPTION OF THE EMBODIMENTS

Figure 1A:
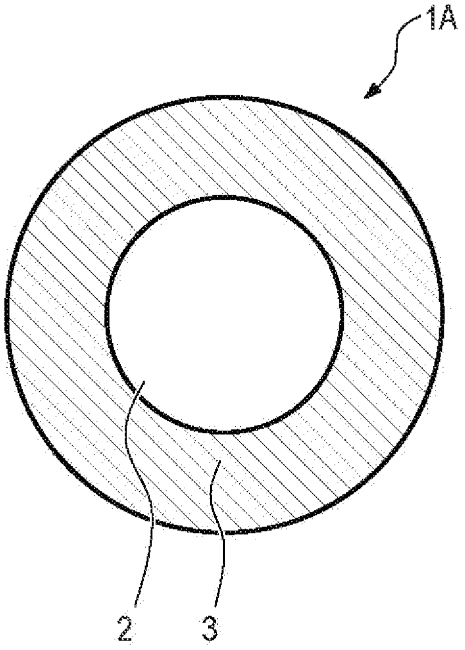
FIG. 1A is a schematic sectional view for illustrating an example of an electrophotographic member according to one aspect of the present disclosure.

In the present disclosure, unless otherwise stated, the descriptions "XX or more and YY or less" and "from XX to YY" each indicating a numerical range each mean a numerical range including a lower limit and an upper limit that are end points. In addition, the case in which the numerical ranges are described step by step discloses an arbitrary combination of the upper limit and the lower limit in each of the numerical ranges.

Amid the recent growing demands for a further increase in print speed and a further increase in quality of an electrophotographic image, an elastic layer of each of a developing roller and a charging roller has been required to recover from deformation more rapidly. However, according to the investigations made by the inventors, the recovery speed from deformation of the urethane elastomer according to Japanese Patent Application Laid-Open No. H09-34216 is still insufficient. In Japanese Patent Application Laid-Open No. H09-34216, there are descriptions that the measurement of the compression set of the urethane elastomer according to Japanese Patent Application Laid-Open No. H09-34216 was performed in accordance with Japanese Industrial Standards (JIS) K6301, and the compression conditions were set to 70° C. for 22 hours. That is, in Japanese Patent Application Laid-Open No. H09-34216, it is conceived that the measurement of the compression set of the urethane elastomer according to Japanese Patent Application Laid-Open No. H09-34216 is performed by compressing the urethane elastomer at a temperature of 70° C. for 22 hours, releasing the urethane elastomer from the compressed state, leaving the resultant to stand for 30 minutes, and then measuring the thickness thereof. However, in the results of such test, even a urethane elastomer exhibiting small compression set still has a low recovery speed from deformation for providing an elastic layer of each of a developing roller and a charging roller for a high-speed image forming apparatus. Thus, the inventors have recognized that it is required to develop an elastic layer exhibiting more rapid deformation recoverability while maintaining flexibility.

Here, in general, when the microrubber hardness of the elastic layer is decreased, the compression set is increased, and the recovery speed from deformation is also decreased. Meanwhile, an increase in elastic modulus of the elastic layer is effective in obtaining an elastic layer that has small compression set and rapidly recovers from deformation. However, the microrubber hardness is also increased along with the increase in elastic modulus of the elastic layer. That is, it has been significantly difficult to obtain an elastic layer having a high recovery speed from deformation while keeping the microrubber hardness of the elastic layer at a low level. The inventors have repeatedly made further investigations to solve such problems. As a result, it has been found that it is effective in solving the above-mentioned problems to use, as a constituent material for the elastic layer, a polyurethane elastomer having incorporated therein a matrix-domain structure including a matrix having a structure capable of increasing a deformation recovery speed and a domain having a structure that contributes to the suppression of an increase in microrubber hardness.

An electrophotographic member and the like according to the present disclosure are described in detail below by way of preferred embodiments.

<Electrophotographic Member>

Figure 1B:
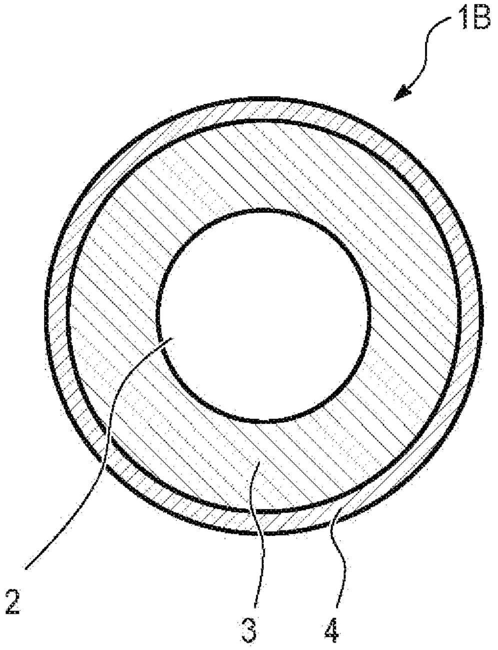
FIG. 1B is a schematic sectional view for illustrating an example of an electrophotographic member according to one aspect of the present disclosure.

FIG. 1A and FIG. 1B are schematic sectional views of two aspects of an electrophotographic member having a roller shape (hereinafter sometimes referred to as "electrophotographic roller") according to the present disclosure in a circumferential direction, respectively. An electrophotographic roller 1A illustrated in FIG. 1A includes a mandrel 2 having electroconductivity and an elastic layer 3 covering a surface (outer peripheral surface) of the mandrel 2. In addition, an electrophotographic roller 1B illustrated in FIG. 1B further includes a surface layer 4 on a surface (hereinafter sometimes referred to as "outer surface") of the elastic layer 3 on an opposite side to a side facing the mandrel 2. The electrophotographic roller according to the present disclosure is not limited to those configurations, and may include, for example, an adhesion layer (not shown) between the respective layers.

(Mandrel)

It is preferred that the mandrel 2 have electroconductivity in order to supply power to the surface of the electrophotographic member through the mandrel. It is preferred that the electric resistance value of the mandrel be lower than that of the elastic layer, and the volume resistivity of the mandrel be 103 Ω·cm or less. A mandrel appropriately selected from those known in the field of the electrophotographic member may be used as the mandrel having electroconductivity, and a mandrel made of a metal, such as aluminum, an aluminum alloy, stainless steel, or iron, is preferred. In addition, those metals may be subjected to plating treatment with chromium, nickel, and the like for improving corrosion resistance and wear resistance. The shape of the mandrel may be any one selected from a hollow shape (cylindrical shape) and a solid shape (columnar shape). For example, a mandrel having a solid columnar shape obtained by plating the surface of a carbon steel alloy with nickel having a thickness of about 5 μm may be used. The outer diameter of the mandrel having a cylindrical shape or a columnar shape may be appropriately selected in accordance with an image forming apparatus on which the mandrel is to be mounted.

(Elastic Layer)

The elastic layer 2 satisfies the following requirements (1-1) to (1-4). Requirement (1-1): The elastic layer 2 contains a polyurethane elastomer, and the polyurethane elastomer has a matrix-domain structure including a matrix and a plurality of domains dispersed in the matrix.

Requirement (1-2): When a parameter indicating a viscoelastic term of each of the domains measured in a viscoelastic image of a cross-section of the elastic layer in a thickness direction with a scanning probe microscope is represented by A, and a parameter indicating a viscoelastic term of the matrix measured in the viscoelastic image is represented by B, A<B is established. That is, in the cross-section of the elastic layer in the thickness direction according to the present disclosure, the matrix-domain structure of the polyurethane elastomer is observed. In addition, the elastic modulus of the matrix of the polyurethane elastomer observed in the cross-section is larger than the elastic modulus of each of the domains.

Requirement (1-3): The elastic layer has a microrubber hardness at a temperature of 23° C. of 20 or more and 50 or less.

Requirement (1-4): In an indentation test of the elastic layer with a nanoindenter at 23° C., when a Vickers indenter is indented into the elastic layer at a load speed of 10 mN/30 sec and is maintained at a load of 10 mN for 60 seconds, followed by unloading, strain after 5 seconds from the unloading is 1 μm or less.

In the polyurethane elastomer according to the present disclosure, a function of recoverability from deformation is imparted to the matrix, and a function of decreasing the hardness of the polyurethane elastomer is imparted to the domain. When such polyurethane elastomer is adopted, the elastic layer according to the present disclosure expresses the softness defined in the requirement (1-3) and the rapid recoverability from deformation defined in the requirement (1-4).

Meanwhile, a general polyurethane elastomer also has a difference in elastic modulus between the so-called hard segment and soft segment. However, it is conceived that there was no polyurethane elastomer that exhibited the high recovery speed from deformation defined in the requirement (1-4) while having the flexibility defined in the requirement (1-3).

Figure 2A:
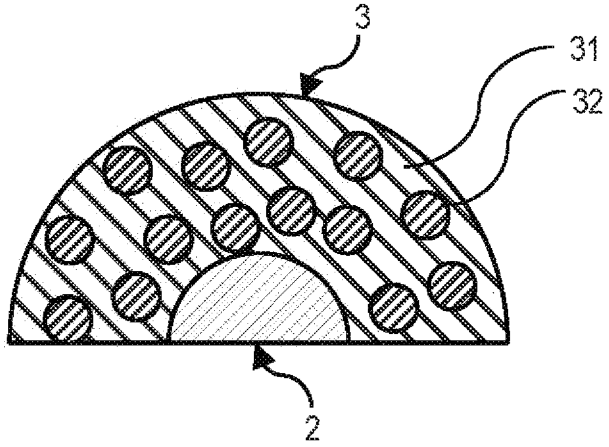
FIG. 2A is a schematic sectional view of one embodiment of an elastic layer of the electrophotographic member according to one aspect of the present disclosure.

FIG. 2A is a partial sectional view of the electrophotographic roller 1A according to one aspect of the present disclosure in a circumferential direction. In addition, FIG. 2B is a partial sectional view of the electrophotographic roller 1A in a direction along a longitudinal direction of the mandrel 2.

Figure 2B:
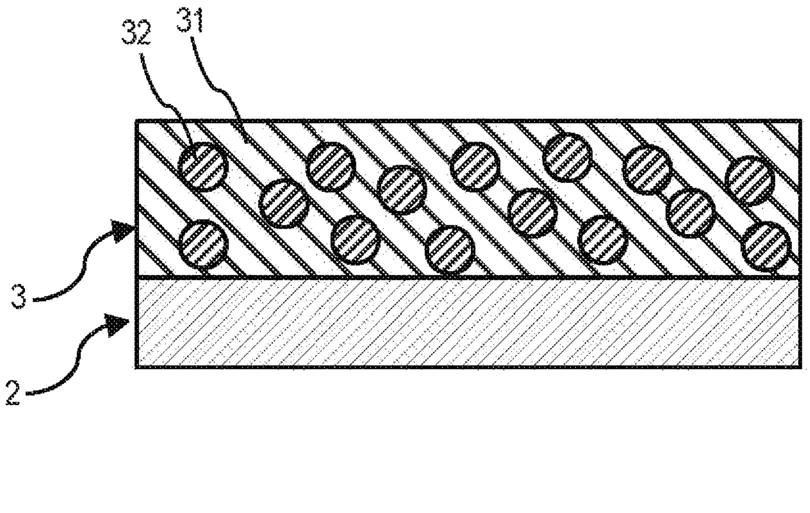
FIG. 2B is a schematic sectional view of one embodiment of the elastic layer of the electrophotographic member according to one aspect of the present disclosure.

In each of FIG. 2A and FIG. 2B, a matrix 31 included in the polyurethane elastomer according to the present disclosure and a plurality of domains 32 dispersed in the matrix 31, which are observed in a cross-section of the elastic layer 3 in a thickness direction, are schematically illustrated.

Figure 3A:
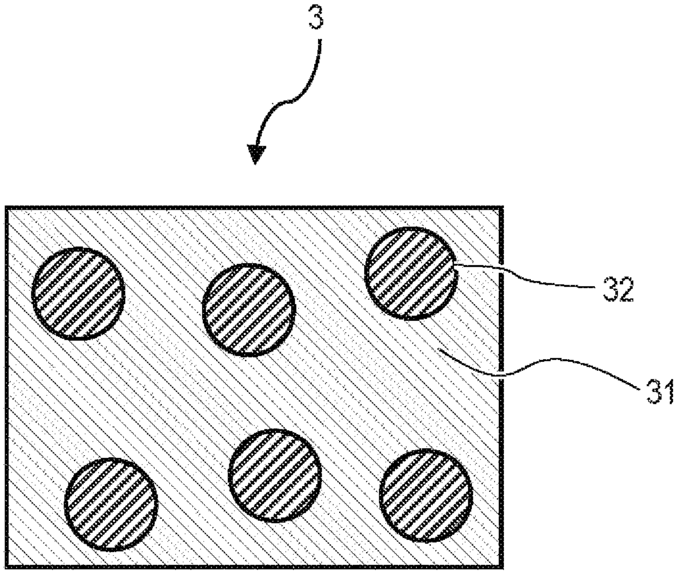
FIG. 3A and FIG. 3B are each a view for illustrating deformation of the elastic layer according to the present disclosure.
Figure 3B:
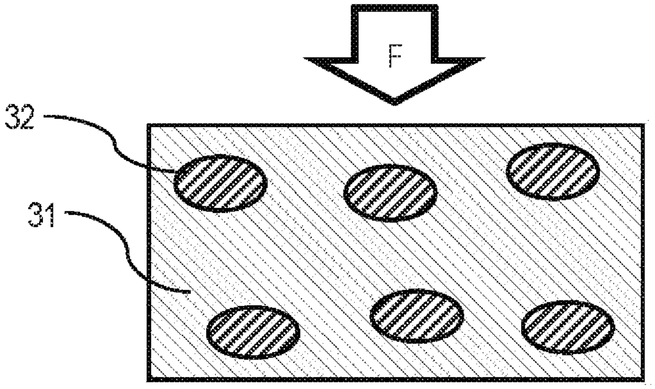

The polyurethane elastomer has a matrix-domain structure including the matrix 31 and the domains 32 dispersed in the matrix as described above. In addition, the matrix 31 has a structure that can increase the deformation recovery speed, and the domains 32 each have a structure that contributes to the suppression of an increase in microrubber hardness. As a result, the matrix exhibits elasticity higher than that of each of the domains. FIG. 3A and FIG. 3B are each an explanatory view of deformation recoverability of the elastic layer 3 according to the present disclosure. As illustrated in FIG. 3A, the plurality of domains 32 are dispersed in the matrix 31. In addition, the domains 32 each have elasticity lower than that of the matrix 31, and hence the domains 32 are preferentially deformed when the elastic layer 3 is compressed in a direction indicated by the arrow F as illustrated in FIG. 3B. Thus, even when the matrix 31 has high elasticity, the microrubber hardness of the elastic layer can be decreased. In addition, when the elastic layer is released from compression, the thickness of the elastic layer can rapidly return to the thickness before compression because of the elasticity of the matrix 31 that is a continuous phase.

(Microrubber Hardness of Elastic Layer)

The hardness of the elastic layer is 20 or more and 50 or less in terms of microrubber hardness. When the microrubber hardness is set to 50 or less, a nip width between a developing roller and a toner regulating member and a nip width between a charging roller and a photosensitive member are increased, and an abutment pressure is not excessively increased. As a result, the melt-adhesion of toner on the developing roller to the developing roller, and the melt-adhesion of toner, which has slipped through a cleaning member to adhere to the developing roller, to the charging roller are less liable to occur. In addition, through setting of the microrubber hardness to 20 or more, a mechanical strength is increased, and even at the time of use in a long-life image forming apparatus, the end portions of the elastic layer are less liable to be abraded.

The microrubber hardness is determined as described below. When the length of the elastic layer in a longitudinal direction is represented by L, the sites at which the microrubber hardness is measured are a total of three sites including the center of the elastic layer in the longitudinal direction and two sites of L/4 from both ends of the elastic layer toward the center. At each of the measurement sites, the surface of the elastic layer is measured for microrubber hardness at a temperature of 23° C. with a microrubber hardness meter (product name: MD-1 capa, manufactured by Kobunshi Keiki Co., Ltd., indenter: type A (cylindrical shape, diameter: 0.16 mm, height: 0.5 mm, outer diameter: 4 mm, inner diameter: 1.5 mm), measurement mode: peak hold mode), and an average of the measurement values is calculated. The calculated average is adopted as the microrubber hardness in the present disclosure.

(Parameter Indicating Viscoelastic Term)

The relative difference in elastic modulus between the matrix 31 and the domain 32 may be measured by preparing a thin slice of the elastic layer and measuring the thin slice for an elastic modulus with a scanning probe microscope (SPM/AFM). For example, "S-Image" (product name) manufactured by Hitachi High-Tech Science Corporation may be used as the scanning probe microscope. In addition, examples of means for preparing the thin slice include a sharp razor, a microtome, and a focused ion beam (FIB) method.

Figure 4:
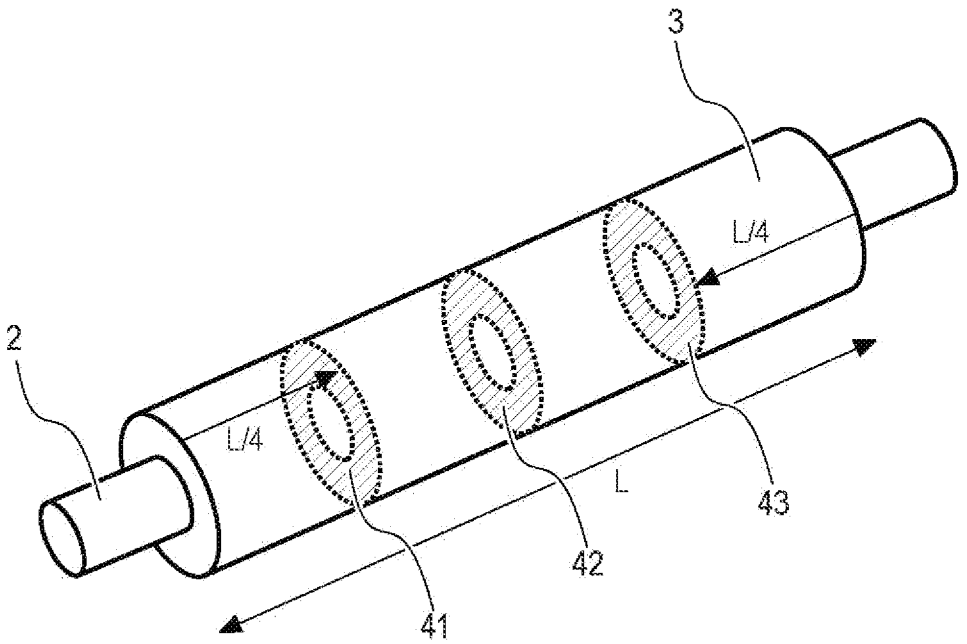
FIG. 4 is a view for illustrating cut-out positions and directions of cross-sections.

Regarding sites for producing slices, when the length of the elastic layer in the longitudinal direction is represented by L, a total of three slices are produced from cross-sections 41 to 43 of the elastic layer in the thickness direction as illustrated in FIG. 4 at the center of the elastic layer in the longitudinal direction and two sites of L/4 from both ends of the elastic layer toward the center. In addition, a region that is deformed when the electrophotographic member is brought into abutment against another member is mainly a thickness region from the outer surface of the elastic layer to a depth of 100 μm. Thus, as an observation area of each of the cross-sections 41 to 43, an arbitrary 50 μm square observation area is selected in a thickness region from the outer surface of each of the slices to a depth of 100 μm, and observation of a viscoelastic image is performed in a total of three observation areas.

The measurement mode of the viscoelastic image with the SPM is microviscoelastic dynamic force mode (referred to as "viscoelastic dynamic force mode (VE-DFM)"). In addition, a microcantilever for DFM made of silicon ("SI-DF3" (product name), manufactured by Hitachi High-Tech Science Corporation, spring constant=1.9 N/m) is used as a cantilever. Further, a scanning frequency is set to 0.5 Hz. The VE-DFM is a mode in which a surface profile image is obtained while the distance between a probe and a measurement sample is controlled so that the vibration and amplitude of a cantilever become constant under a state in which the cantilever is resonated.

After the viscoelastic image had been acquired, parameters each indicating the viscoelastic term in each of the observation areas were determined at 10 points in each of the matrix and the domain, and the averages thereof were adopted as a parameter A indicating the viscoelastic term of the domain and a parameter B indicating the viscoelastic term of the matrix in the present disclosure. The unit of each of the parameter A and the parameter B is mV, and a larger value thereof indicates higher elasticity.

The ratio (A/B) of the parameter A to the parameter B is preferably 0.65 or less. When the ratio (A/B) is smaller, the difference in viscoelasticity between the matrix and the domain is increased, and hence both the hardness and the recovery from deformation can be easily achieved.

(Recoverability from Deformation)

In an indentation test of the elastic layer 3 with a nanoindenter at a temperature of 23° C., when a Vickers indenter is indented into the elastic layer at a load speed of 10 mN/30 sec and is maintained at a load of 10 mN for 60 seconds, followed by unloading, strain after 5 seconds from the unloading is 1 μm or less.

When the strain after 5 seconds from the unloading at the time of the measurement under the above-mentioned conditions is set to 1 μm or less, a streak-like image defect in the case of the application of the elastic layer to a developing roller in a high-speed printer can be suppressed. This is because the deformation of the developing roller can be recovered to the ordinary size of one toner or less in a short period of time from the operation of the high-speed printer to the development of an electrostatic latent image. In addition, even when the elastic layer is applied to a charging roller, the recovery from deformation is rapid, and hence unevenness of discharge to the photosensitive member is less liable to occur. Thus, the occurrence of a streak-like image defect due to charging unevenness of the photosensitive member can be prevented.

In the present disclosure, "FISCHERSCOPE HM2000" (product name, manufactured by Fischer Instruments K.K.) is used as a nanoindenter, and a measurement value at a temperature of 23° C. is adopted. In addition, a square pyramid type Vickers indenter having a facing angle of 136° is used as an indenter to be used for measurement. Further, when the length of the elastic layer in the longitudinal direction is represented by L, measurement positions are a total of three sites including the center of the elastic layer in the longitudinal direction and two sites of L/4 from both ends of the elastic layer toward the center. An average when measurement is performed with the nanoindenter at each of the measurement sites is adopted as strain after 5 seconds from the unloading in the present disclosure.

(Elastic Modulus of Matrix)

The elastic modulus of the matrix 31 is preferably 2 MPa or more and 8 MPa or less. When the elastic modulus of the matrix is set to 2 MPa or more, the effect of the matrix as a spring is enhanced, and the recovery from deformation can be accelerated. In addition, when the elastic modulus of the matrix is set to 8 MPa or less, the hardness of the matrix is decreased, and the microrubber hardness of the elastic layer can be suppressed to be low.

The elastic modulus of the matrix may be measured by preparing a thin slice of the elastic layer and measuring the thin slice for an elastic modulus with a scanning probe microscope (SPM/AFM). For example, "MFP-3D-Origin" (product name) manufactured by Oxford Instruments plc may be used as the scanning probe microscope. In addition, examples of means for preparing the thin slice include a sharp razor, a microtome, and a focused ion beam (FIB) method.

Regarding sites for producing slices, when the length of the elastic layer in the longitudinal direction is represented by L, a total of three slices are produced in the thickness direction of the elastic layer as illustrated in FIG. 4 at the center of the elastic layer in the longitudinal direction and two sites of L/4 from both ends of the elastic layer toward the center. In addition, regarding an observation area of each of the cross-sections 41 to 43, an arbitrary 50 μm square observation area is selected in a thickness region from the outer surface of each of the slices to a depth of 100 μm, and a phase image is observed in a total of three observation areas. The measurement mode of the phase image with the SPM is set to AM-FM. In addition, a silicon cantilever for a dynamic mode, for example, "OMCL-AC-160TS" (product name, manufactured by Olympus Corporation, spring constant=47.08 N/m) is used as a cantilever. Further, a scanning frequency is set to 0.5 Hz.

After the phase image has been acquired, a force curve is measured with the SPM in order to measure the elastic modulus of the matrix. The measurement mode of the force curve is set to a contact mode, a force distance is set to 500 nm, and a trigger point is set to 0.01 V. In addition, in the same manner as above, a silicon cantilever for a dynamic mode, for example, "OMCL-AC-160TS" (product name, manufactured by Olympus Corporation, spring constant=47.08 N/m) is used as a cantilever. A scanning frequency is set to 1 Hz.

The elastic modulus of the matrix was determined at 10 points in each of the observation areas, and an average thereof was adopted as the elastic modulus of the matrix in the present disclosure.

(Sectional Areas and Number of Domains)

The sectional areas and number of the domains 32 of the polyurethane elastomer observed in the cross-section of the elastic layer in the thickness direction are described.

When the length of the elastic layer in the longitudinal direction is represented by L, three sites including the center of the elastic layer in the longitudinal direction and three sites of L/4 from both ends of the elastic layer toward the center are designated. Regarding each of the cross-sections of the elastic layer in the thickness direction at those three sites, when a 50 μm square observation area is arbitrarily placed in a thickness region from the outer surface of the elastic layer to a depth of 100 μm, it is preferred that all the three sites of the observation areas satisfy the following requirements (2-1) and (2-2).

Requirement (2-1): The ratio of the sum of cross-sections of the domains that are present in the observation area to the area of the observation area is 15% or more and 45% or less.

Requirement (2-2): When the sectional area of each of the domains that are present in the observation area is calculated, the ratio of the number of the domains each having a sectional area of 0.1% or more and 13% or less of the area of the observation area to the total number of the domains that are present in the observation area is 70 number % or more.

Regarding the requirement (2-1), when the ratio of the sum of the sectional areas of the domains to the area of the observation area is set to 15% or more, the microrubber hardness of the elastic layer can be suppressed to be low. In addition, when the ratio is set to 45% or less, the recovery from deformation of the elastic layer can be accelerated.

Regarding the requirement (2-2), when the number of the domains each having a sectional area of from 0.1% to 13.0% of the area of the observation area is set to 70% or more of the total number of the domains in the observation area, the number of the domains each having such a size that the domains can be sufficiently deformed when the elastic layer is subjected to pressure contact is ensured. Thus, the microrubber hardness of the elastic layer can be decreased. In addition, the number of large domains that are excessively deformed when a load is applied to the elastic layer is small, and hence an excess decrease in microrubber hardness of the elastic layer can be suppressed.

Here, the sectional areas and number of the domains are determined as described below. First, slices are produced by the same method as the method in the measurement of the elastic modulus of the matrix described above. Regarding sites for producing slices, when the length of the elastic layer in the longitudinal direction is represented by L, slices in which the cross-sections 41, 42, and 43 of the elastic layer in the total thickness direction are exposed as illustrated in FIG. 4 are produced at the center of the elastic layer in the longitudinal direction and three sites of L/4 from both ends of the elastic layer toward the center. Then, a 50 μm square observation area is set at an arbitrary position in a thickness region from the outer surface of the elastic layer to a depth of 100 μm of each of the slices. Then, the sectional areas, number, and circularities of the domains are measured in a total of three observation areas.

The sectional areas and number of the domains in the observation area may be measured as described below. First, a cross-section is observed with a scanning electron microscope (SEM), a transmission electron microscope (TEM), or a scanning probe microscope (SPM/AFM). The resultant sectional image is converted into a 256-gradation monochromatic image with image processing software such as "ImageProPlus" (product name, manufactured by Media Cybernetics, Inc.) Then, binarization processing is performed with the image processing software to provide a binarized image. A method for the binarization is not particularly limited as long as the domains and the matrix in the monochromatic image can be discriminated, but there is given, for example, a method involving setting a threshold for binarization from a brightness distribution of the monochromatic image based on the algorism of Otsu described in IEEE Transactions on SYSTEMS, MAN, AND CYBERNETICS, Vol. SMC-9, No. 1, January 1979, pp. 62-66.

Next, the count function of the image processing software is used in the binarized image to provide the sectional area of each of the domains that are present in the observation area and the number of the domains. In the resultant binarized image for analysis, minute dots derived from noise may be present. When analysis is performed based on the binarized image containing such minute dots derived from noise through use of the image processing software, the dots derived from noise may also be counted as the domains. Thus, it is preferred that, of those determined to be domains with the count function, domains each having a sectional area of less than 0.05% with respect to the 50 μm square observation area be regarded as domains derived from noise and deleted from the data.

(Circularities of Domains)

Further, it is preferred that, regarding the domains of the polyurethane elastomer observed in the cross-section of the elastic layer in the thickness direction, the ratio of the number of the domains each having a circularity of 0.60 or more and 0.95 or less to the total number of the domains that are present in the observation area be 70 number % or more.

A domain having a certain degree of circularity or more is less liable to exhibit anisotropy in a direction in which the shape of the domain recovers when the domain recovers from deformation. In addition, when the number (ratio) of the domains each having a certain degree of circularity or more is large, anisotropy is less liable to occur in the recovery from deformation of the elastic layer. As a result, wrinkles and the like due to the anisotropy of deformation recovery are less liable to occur in the elastic layer after recovery from deformation.

Here, the circularities and number of the domains may be determined through use of the count function of the image processing software at the same time as the above-mentioned measurement of the sectional areas and number of the domains.

(Material for Elastic Layer)

A polyurethane elastomer that can achieve the elastic layer according to the present disclosure is described. As described above, the polyurethane elastomer according to the present disclosure has a matrix-domain structure including the matrix 31 and the domains 32 dispersed in the matrix. The matrix 31 has a structure that can increase the deformation recovery speed, and the domains 32 each have a structure that contributes to the suppression of an increase in microrubber hardness.

It is preferred that the matrix 31 of such polyurethane elastomer have a polycarbonate structural unit represented by the general formula (1) as a repeating structural unit. Further, it is more preferred that an alkylene group having 3 to 9 carbon atoms represented by $R_1$ in the repeating structural unit represented by the general formula (1) have a branched structure.

General formula (1)

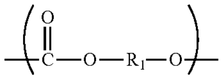

$R_1$ represents an alkylene group having 3 to 9 carbon atoms.

In general, a polyurethane obtained by a reaction between a polyol having a polycarbonate structure (polycarbonate polyol) and a polyisocyanate exhibits high elasticity because of its strong intermolecular force between carbonate groups. Thus, such polyurethane is preferred as a constituent component of the matrix 31.

When $R_1$ represents an alkylene group having 3 to 9 carbon atoms, incompatibility with the domains each containing a polyether having a repeating structural unit represented by the general formula (2) described later is ensured, and the matrix and the domains can be clearly phase-separated. Thus, the two functions of softness and rapid recovery from deformation of the polyurethane elastomer according to the present disclosure can be exhibited more reliably.

In addition, when $R_1$ contains an alkylene group having a branched structure that has 3 to 9 carbon atoms, the intermolecular force between carbonate groups can be appropriately suppressed, and an excess increase in elasticity of the matrix can be suppressed.

Examples of $R_1$ include $-(CH_2)_m-$ (m=3 to 9), $-CH_2C(CH_3)_2CH_2-$, $-CH_2CH(CH_3)CH_2-$, and $-(CH_2)_2CH(CH_3)(CH_2)_2-$. Those groups may be used alone or in combination thereof.

The number average molecular weight of a polyol or the like described later, as well as the number average molecular weight of the above-mentioned polycarbonate, may be calculated from the following mathematical formula with a hydroxyl value (mgKOH/g) and a valence. For example, the number average molecular weight of a polyether polyol having a hydroxyl value of 56.1 mgKOH/g and a valence of 2 maybe calculated to be 2,000.

$$\text{Number average molecular weight}=56.1\times 1{,}000\times \text{valence}/\text{hydroxyl value}$$

The elastic modulus of the matrix may be adjusted by, for example, a method involving increasing a crosslink density through use of a trimer compound or a multimer compound of a polyisocyanate. In general, when the elastic modulus is increased, the microrubber hardness of the elastic layer is also increased. However, in the present disclosure, the plurality of domains each having low elasticity are dispersed in the matrix, and hence an excess increase in hardness can be suppressed.

It is preferred that the domains 32 each include a polyether structural unit represented by the general formula (2) as a repeating structural unit. Further, it is more preferred that an alkylene group having 3 to 5 carbon atoms represented by $R_2$ in the structural unit represented by the general formula (2) have a branched structure.

General formula (2)

$$-\!(R_2-O)\!-$$

$R_2$ represents an alkylene group having 3 to 5 carbon atoms.

In general, a polyether exhibits a low elastic modulus because of its weak intermolecular force between ether groups, and hence is preferred as a component of the domains.

It is preferred that the domains each include an alkylene group having 3 to 5 carbon atoms because incompatibility with the polyurethane elastomer including the polycarbonate structural unit represented by the general formula (1) is ensured, and the matrix and the domains are clearly phase-separated.

Examples of $R_2$ include $-(CH_2)_m-$ (m=3 to 5), $-CH_2CH(CH_3)-$, $-CH_2C(CH_3)_2CH_2-$, $-CH_2CH(CH_3)CH_2-$, and $-(CH_2)_2CH(CH_3)CH_2-$. The groups may be used alone or in combination thereof.

The number average molecular weight of the polyether structural unit represented by the general formula (2) is preferably 1,000 or more and 50,000 or less, more preferably 1,200 or more and 30,000 or less.

It is preferred that the number average molecular weight be 1,000 or more because incompatibility with the polyurethane elastomer including the polycarbonate structural unit represented by the general formula (1) is ensured, and the phase separation between the matrix and the domains is made clear. In addition, it is preferred that the number average molecular weight be 50,000 or less because the domains are easily formed, and the phase separation form is stabilized.

The ratio of the total of the sectional areas of the domains may be regulated by, for example, the blending ratios of the polyurethane elastomer including the polycarbonate structural unit of the general formula (1) of the matrix and the polyether structural unit of the general formula (2) of the domains. When the blending ratio of the polyether structural unit of the general formula (2) is increased, the ratio of the total of the sectional areas of the domains is increased. However, when the blending ratio of the polyether structural unit of the general formula (2) is excessively increased, the matrix and the domains may be reversed, and the polyether structural unit of the general formula (2) may become the main component of the matrix. In addition, the sectional areas of the domains may be increased by, for example, increasing the number average molecular weight of the polyether structural unit of the general formula (2).

The chemical structures of components in the matrix and the domains may be analyzed with, for example, a spectroscopic analyzer, such as an AFM infrared spectroscopic analyzer, a microscopic infrared spectroscopic analyzer, or a microscopic Raman spectroscopic analyzer, or a mass spectrometer.

(Method of Producing Polyurethane Elastomer)

As an example of a method of producing the above-mentioned polyurethane elastomer, there is given a method including the following steps (i) to (iii):

step (i): a step of allowing a first polyether having at least two isocyanate groups and a first polycarbonate polyol having at least two hydroxy groups to react with each other to provide a urethane reactive emulsifier having at least two hydroxy groups;

step (ii): a step of providing a dispersion in which liquid droplets each containing at least part of the urethane reactive emulsifier are dispersed in a second polycarbonate polyol; and step (iii): a step of preparing a mixture for forming an elastic layer containing the dispersion obtained in the step (ii) and a polyisocyanate having at least two isocyanate groups with each other, and then allowing the urethane reactive emulsifier, the second polycarbonate polyol, and the polyisocyanate in the mixture for forming an elastic layer to react with each other.

Figure 5:
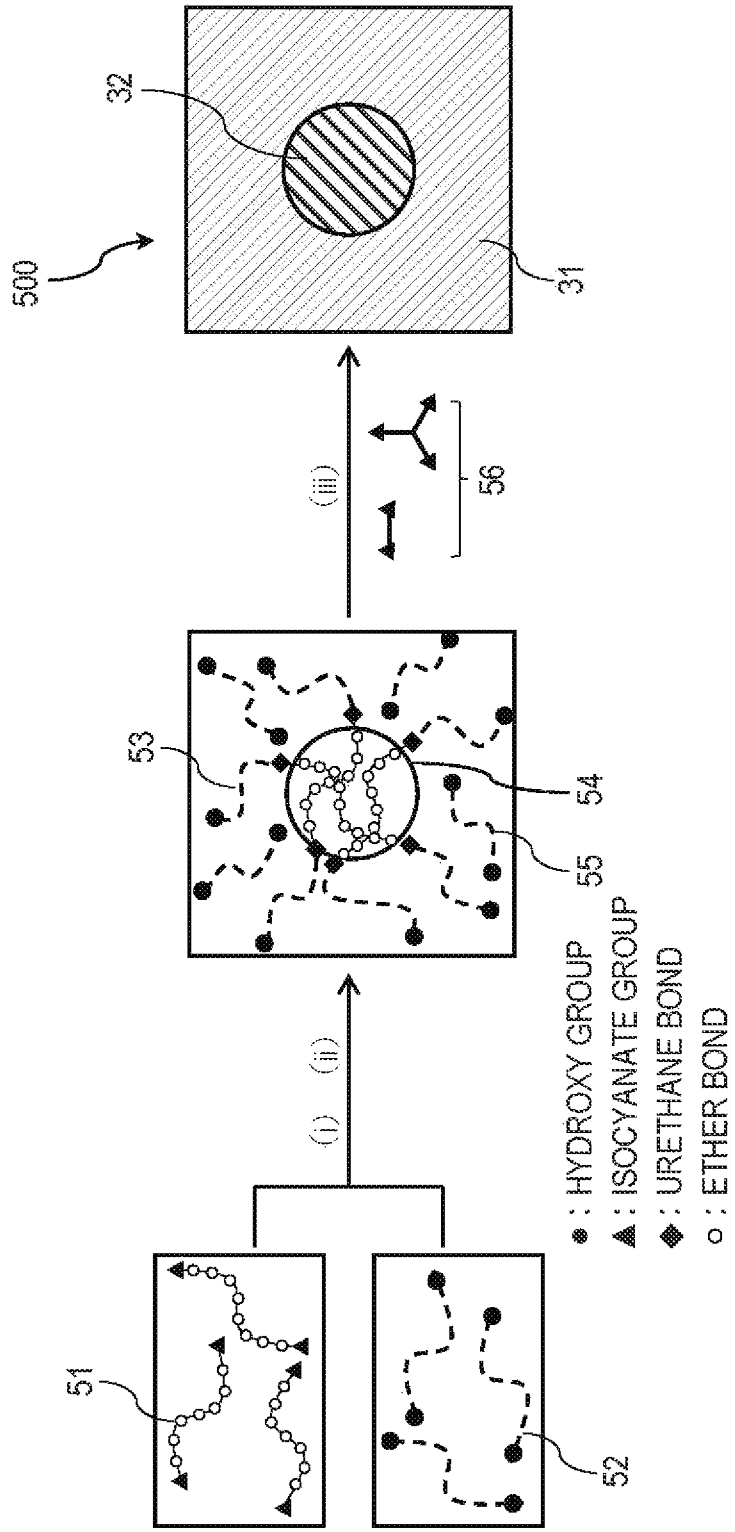
FIG. 5 is a schematic view for illustrating a method of producing an electrophotographic member according to one embodiment of the present disclosure.

Each of the steps of the above-mentioned production method is described with reference to FIG. 5.

In the step (i), a first polyether 51 having at least two isocyanate groups and a first polycarbonate polyol 52 having at least two hydroxy groups are mixed. The isocyanate group and the hydroxy group in the mixture are allowed to react with each other in the presence of a catalyst to be linked to each other through a urethane bond. Thus, a urethane reactive emulsifier 53 having at least two hydroxy groups is obtained.

In the step (ii), the urethane reactive emulsifier 53 obtained in the step (i) is dispersed in a second polycarbonate polyol 55. A segment derived from the first polyether 51 contained in the urethane reactive emulsifier 53 forms a liquid droplet 54 without being compatible with the second polycarbonate polyol 55. Meanwhile, the liquid droplet 54 containing the segment derived from the first polyether forming part of the urethane reactive emulsifier is uniformly and stably dispersed in the second polycarbonate polyol 55 through a segment derived from the first polycarbonate polyol 52 contained in the urethane reactive emulsifier 53. As a result, a dispersion in which the liquid droplet 54 containing the segment derived from the first polyether 51 of the urethane reactive emulsifier 53 is dispersed in the second polycarbonate polyol 55 is obtained. For the sake of description, the step (i) and the step (ii) are described separately, but these steps may be a continuous series of steps.

In the step (ii), the second polycarbonate polyol 55 in which the liquid droplet 54 is dispersed may be an unreacted product with the first polyether in the first polycarbonate polyol used in the step (i). That is, through use of an excess amount of the first polycarbonate polyol with respect to the first polyether in the step (i), a dispersion in which the urethane reactive emulsifier 53 is dispersed in the excess first polycarbonate polyol, that is, the second polycarbonate polyol 55, described in the step (ii) can be obtained. Even when the first polycarbonate polyol is used in an excess amount, a polycarbonate polyol (second polycarbonate polyol) serving as a dispersion medium for the urethane reactive emulsifier may also be additionally added. In this case, the polycarbonate polyol to be added may have the same chemical composition as that of the first polycarbonate polyol used in the step (i) or may be different therefrom.

Meanwhile, when the first polycarbonate polyol and the first polyether are allowed to react with each other in equivalent amounts, and the entire first polycarbonate polyol is consumed in the step (i), a new polycarbonate polyol is used as the second polycarbonate polyol to prepare a dispersion in the step (ii). Also in this case, the polycarbonate polyol used as the second polycarbonate polyol may have the same chemical composition as that of the first polycarbonate polyol or may be different therefrom.

Finally, in the step (iii), a mixture for forming an elastic layer containing the dispersion prepared in the step (ii) and a polyisocyanate 56 having at least two isocyanate groups is prepared. Then, the terminal hydroxy group of the urethane reactive emulsifier 53, the hydroxy group of the second polycarbonate polyol 55, and the isocyanate group of the polyisocyanate 56 in the mixture for forming an elastic layer are allowed to react with each other. Thus, a network structure through a urethane bond is formed to cure the mixture for forming an elastic layer, to thereby provide a polyurethane elastomer according to the present disclosure. A polyurethane elastomer 500 thus obtained has a matrix-domain structure in which the domains 32 each including the polyether derived from the first polyether 51 are dispersed in the matrix 31 including the polyurethane elastomer including the polycarbonate derived from the first polycarbonate polyol 52 and the second polycarbonate polyol 55. In addition, the domains 32 mainly include a polyether structure portion, and the inside of the domain may be substantially free of a crosslinked structure. In other words, the domains 32 may be present in the matrix 31 in a substantially liquid state. With this configuration, in the polyurethane elastomer according to the present disclosure, the domain can have a low elastic modulus.

Further, regarding the domain, a liquid portion is not simply confined in the matrix, but the domain and the matrix are chemically bonded to each other through a urethane bond in a boundary portion between the domain and the matrix. Thus, the recovery from deformation of the domain when the load applied to the polyurethane elastomer is removed can be linked to the recovery from deformation of the matrix. That is, the domain in a substantially liquid form is substantially free of a crosslinked structure therein. Thus, it is difficult for the domain, which is deformed by applying a load to the polyurethane elastomer, to recover from deformation autonomously. However, in the polyurethane elastomer according to the present disclosure, the domain is chemically bonded to the matrix in a boundary portion with the matrix, and hence the domain can also recover from deformation together with the deformation recovery of the matrix. As a result, stable deformation (deformation amount) and stable recovery from the deformation are achieved even when the polyurethane elastomer is repeatedly subjected to the application and removal of a load.

The above-mentioned steps (i) and (ii) are steps of stably dispersing a polyether, which originally has low compatibility with a polyol and is difficult to disperse therein stably and uniformly, in the polyol. That is, the steps (i) and (ii) are steps of allowing the first polyether 51 and the first polycarbonate polyol 52 to react with each other to form the urethane reactive emulsifier 53, thereby providing a dispersion in which the segment of the polyether derived from the first polyether 51 is stably and uniformly dispersed in the second polycarbonate polyol. As a result, the polyurethane elastomer in which the domains 32 each having high circularity, a small size of the micrometer order, and a relatively uniform size distribution are dispersed in the polyurethane 31 serving as the matrix can be produced.

As another method of mixing materials having low compatibility with each other, there is given, for example, a method involving mixing and dispersing the materials with a high shearing force. However, in this method, as a result of the application of a high shearing force to the polyether, the shape of each of the domains gets distorted to decrease circularity, and the sizes of the domains may also become non-uniform. In addition, the dispersed state is also unstable, and the aggregation of the domains progresses in a relatively short period of time. In addition, the incompatibility between the polyether and the polycarbonate polyol is not ensured, and the phase separation between the matrix and the domains of a polyurethane elastomer to be obtained is made unclear. Thus, it is difficult to obtain such a polyurethane elastomer as to provide an elastic body that is flexible and is excellent in deformation recoverability according to the present disclosure.

The first polyether is a polyether having at least two isocyanate groups and the repeating structural unit represented by the general formula (2). The first polyether may be obtained through the step of allowing a polyether polyol having at least two hydroxy groups and the repeating structural unit represented by the general formula (2) and a polyisocyanate having at least two isocyanate groups to react with each other.

Examples of the polyether polyol include: alkylene structure-containing polyether-based polyols, such as polypropylene glycol, polytetramethylene glycol, a copolymer of tetrahydrofuran and neopentyl glycol, and a copolymer of tetrahydrofuran and 3-methyltetrahydrofuran; and random or block copolymers of those polyalkylene glycols. Those polyether polyols may be used alone or in combination thereof.

Of the polyether polyols, an amorphous polyether polyol is preferred from the viewpoint that the incompatibility with the second polycarbonate polyol and the low hardness can be achieved.

It is more preferred that the polyether polyol includes at least one selected from polypropylene glycol, a copolymer of tetrahydrofuran and neopentyl glycol, and a copolymer of tetrahydrofuran and 3-methyltetrahydrofuran.

The number average molecular weight of the polyether polyol is preferably 1,000 or more and 50,000 or less, more preferably 1,200 or more and 30,000 or less. It is preferred that the number average molecular weight be 1,000 or more because the incompatibility with the polycarbonate polyol is ensured, and the phase separation between the matrix and the domains of a polyurethane elastomer to be obtained is made clear. In addition, it is preferred that the number average molecular weight be 50,000 or less because the domains are easily formed, and the phase separation form is stabilized.

Examples of the polyisocyanate to be allowed to react with the polyether polyol include pentamethylene diisocyanate, hexamethylene diisocyanate, isophorone diisocyanate, 2,4-tolylene diisocyanate, 2,6-tolylene diisocyanate, xylylene diisocyanate, diphenylmethane diisocyanate, or a trimer compound (isocyanurate) or multimer compound of any of those polyisocyanates, an allophanate-type polyisocyanate, a biuret-type polyisocyanate, and a water dispersion-type polyisocyanate. Those polyisocyanates may be used alone or in combination thereof.

Of the polyisocyanates, a bifunctional isocyanate having two isocyanate groups is preferred because of high compatibility with the first polyether and the ease of adjustment of physical properties such as viscosity. It is more preferred that the polyisocyanate include at least one selected from hexamethylene diisocyanate, isophorone diisocyanate, 2,4-tolylene diisocyanate, 2,6-tolylene diisocyanate, xylylene diisocyanate, and diphenylmethane diisocyanate.

In the step of allowing the polyether polyol and the polyisocyanate to react with each other, an isocyanate index is preferably in a range of from 1.2 to 5.0. When the isocyanate index falls within the above-mentioned range, the amount of the component derived from the first polyether, which remains without forming a network structure, is reduced, and the exudation of a liquid substance from the polyurethane elastomer can be suppressed. The isocyanate index indicates a ratio ([NCO]/[OH]) of the number of moles of isocyanate groups in an isocyanate compound to the number of moles of hydroxy groups in a polyol compound.

The first polyether obtained by the reaction between the polyether polyol and the polyisocyanate has a structure in which a hydroxy group and an isocyanate group are allowed to react with each other to be linked to each other through a urethane bond. The number average molecular weight thereof is preferably 1,000 or more and 50,000 or less, more preferably 1,200 or more and 30,000 or less.

The first polycarbonate polyol is a polycarbonate polyol having at least two hydroxy groups and the repeating structural unit represented by the general formula (1). Examples of the first polycarbonate polyol include a reaction product of a polyhydric alcohol and phosgene and a ring-opening polymerized product of a cyclic carbonate (e.g., an alkylene carbonate).

Examples of the polyhydric alcohol include propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerin, trimethylolpropane, trimethylolethane, cyclohexanediols (e.g., 1,4-cyclohexanediol), and sugar alcohols (e.g., xylitol and sorbitol).

Examples of the alkylene carbonate include trimethylene carbonate, tetramethylene carbonate, and hexamethylene carbonate.

The number average molecular weight of the first polycarbonate polyol is preferably 500 or more and 10,000 or less, more preferably 700 or more and 8,000 or less. When the number average molecular weight is 500 or more, the incompatibility with the domains each containing the polyether having the repeating structural unit represented by the general formula (2) is ensured, and the phase separation between the matrix and the domains can be made further clear. In addition, when the number average molecular weight is set to 10,000 or less, an excess increase in viscosity of the first polycarbonate polyol can be prevented.

The polycarbonate polyol given in the above-mentioned first polycarbonate polyol may be used as the second polycarbonate polyol to be used in the step (ii). As described above, the first polycarbonate polyol and the second polycarbonate polyol may have the same chemical composition, or the first polycarbonate polyol and the second polycarbonate polyol having different chemical compositions may be used.

The same polyisocyanates as those exemplified above as the raw material for the first polyether may each be used as the polyisocyanate 56 having at least two isocyanate groups to be used in the step (iii). Those polyisocyanates may be used alone or in combination thereof.

The polyisocyanate 56 preferably includes, of the polyisocyanates exemplified above, a polyisocyanate having at least three isocyanate groups, such as a trimer compound (isocyanurate) or multimer compound of a polyisocyanate, an allophanate-type polyisocyanate, or a biuret-type polyisocyanate, from the viewpoint that the elastic modulus of the matrix can be increased. The polyisocyanate 56 more preferably includes any one of a trimer compound (isocyanurate) of pentamethylene diisocyanate, a trimer compound (isocyanurate) of hexamethylene diisocyanate, and a multimer compound of diphenylmethane diisocyanate.

A urethanization catalyst and an isocyanuration catalyst (isocyanate trimerization catalyst), which are hitherto known, may each be used as a catalyst. Those catalysts may be used alone or as a mixture thereof.

Examples of the urethanization catalyst include: tin-based urethanization catalysts, such as dibutyltin dilaurate and stannous octoate; and amine-based urethanization catalysts, such as triethylenediamine, tetramethylguanidine, pentamethyldiethylenetriamine, diethylimidazole, tetramethylpropanediamine, N,N,N'-trimethylaminoethylethanolamine, and 1,4-diazabicyclo[2.2.2]octane-2-methanol. Those urethanization catalysts may be used alone or as a mixture thereof.

Examples of the isocyanuration catalyst include: metal oxides, such as $Li_2O$ and $(Bu_3Sn)_2O$; hydride compounds such as $NaBH_4$; alkoxide compounds, such as $NaOCH_3$, KO-(t-Bu), and a boric acid salt; amine compounds, such as $N(C_2H_5)_3$, $N(CH_3)_2CH_2C_2H_5$, and 1,4-ethylenepiperazine (DABCO); alkaline carboxylate salt compounds, such as HCOONa, $Na_2CO_3$, PhCOONa/DMF, $CH_3COOK$, $(CH_3COO)_2Ca$, alkaline soap, and a naphthenic acid salt; alkaline formic acid salt compounds; and quaternary ammonium salt compounds such as $((R)_3—NR'OH)—OCOR''$. In addition, examples of a combined catalyst (co-catalyst) used as the isocyanuration catalyst include an amine/epoxide, an amine/carboxylic acid, and an amine/alkyleneimide. Those isocyanuration catalysts and combined catalysts may be used alone or as a mixture thereof.

A chain extender (polyfunctional low-molecular-weight polyol) may be used, as required, in the production method according to the present disclosure. The chain extender is, for example, a glycol having a number average molecular weight of 1,000 or less. Examples of the glycol include ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol. In addition, the chain extender except the glycol is, for example, a polyhydric alcohol that is trihydric or higher. Examples of the polyhydric alcohol that is trihydric or higher include trimethylolpropane, glycerin, pentaerythritol, and sorbitol. Those glycols may be used alone or as a mixture thereof.

In addition, additives, such as a pigment, a plasticizer, a water-proofing agent, an antioxidant, an electroconductive agent, a UV absorber, and a photostabilizer, may be used together as required.

(Method of Producing Elastic Layer)

The elastic layer may be formed by, for example, performing the reaction according to the step (iii) in the method of producing a polyurethane elastomer described above on the surface of the mandrel.

Specifically, for example, there is given a method involving curing, on the peripheral surface of the mandrel, the mixture for forming an elastic layer containing the dispersion prepared in the step (ii) and the polyisocyanate having at least two isocyanate groups. That is, as the method of producing an elastic layer according to the present disclosure, for example, the elastic layer can be produced by the method including the following steps (2-i) to (2-iv):

step (2-i): a step of allowing a first polyether having at least two isocyanate groups and a first polycarbonate polyol having at least two hydroxy groups to react with each other to provide a urethane reactive emulsifier having at least two hydroxy groups;

step (2-ii): a step of providing a dispersion in which liquid droplets each containing at least part of the urethane reactive emulsifier are dispersed in a second polycarbonate polyol;

step (2-iii): a step of mixing the dispersion and a polyisocyanate having at least two isocyanate groups with each other to provide a mixture for forming an elastic layer; and step (2-iv): a step of allowing the urethane reactive emulsifier, the second polycarbonate polyol, and the polyisocyanate in the mixture for forming an elastic layer to react with each other on a surface of the mandrel, to thereby provide the elastic layer.

As a method of curing the mixture for forming an elastic layer on the surface of the mandrel, for example, a method (cast molding method) involving injecting a material for an elastic layer into a mold including a cylindrical pipe, a bridge for holding a mandrel, and the mandrel, followed by heating and curing, may be used. In addition, a method involving applying a mixture for forming an elastic layer onto the surface of a mandrel to form a coating film and heating and curing the coating film may also be used.

(Surface Layer)

A surface layer may also be formed, as required, on the surface of the elastic layer. Examples of a material for forming the surface layer may include a resin, a natural rubber, and a synthetic rubber. A thermosetting resin or a thermoplastic resin may be used as the resin. In particular, a fluororesin, a polyamide resin, an acrylic resin, a polyurethane resin, a silicone resin, or a butyral resin is preferred as the resin because the viscosity of a paint can be easily controlled. Those resins may be used alone or in combination thereof. The material may also be a copolymer.

An electroconductive agent may be blended in the surface layer in order to adjust the electric resistance of an electrophotographic roller. The volume resistivity of the surface layer may be adjusted with an ion conductive agent or an electron conductive agent.

Examples of the ion conductive agent include: inorganic ion substances, such as lithium perchlorate, sodium perchlorate, and calcium perchlorate; cationic surfactants, such as lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide, and modified aliphatic dimethylethylammonium ethosulfate; zwitterionic surfactants, such as lauryl betaine, stearyl betaine, and dimethylalkyllauryl betaine; quaternary ammonium salts, such as tetraethylammonium perchlorate, tetrabutylammonium perchlorate, and trimethyloctadecylammonium perchlorate; and organic acid lithium salts such as lithium trifluoromethanesulfonate. The ion conductive agents may be used alone or in combination thereof.

Examples of the electron conductive agent include: metallic fine particles or fibers, such as aluminum, palladium, iron, copper, and silver; electroconductive metal oxides, such as titanium oxide, tin oxide, and zinc oxide; composite particles in which the surfaces of the metallic fine particles or fibers or the metal oxides are surface-treated by electrolytic treatment, spray coating, or mixing/shaking; and carbon powders, such as furnace black, thermal black, acetylene black, Ketjen black, polyacrylonitrile (PAN)-based carbon, and pitch-based carbon.

The surface layer may contain other particles. Examples of the other particles may include insulating particles. Examples of the insulating particles include: a polyamide resin, a silicone resin, a fluororesin, a (meth)acrylic resin, a styrene resin, a phenol resin, a polyester resin, a melamine resin, a urethane resin, an olefin resin, an epoxy resin, or copolymers, modified products, or derivatives thereof; rubbers, such as ethylene-propylene-diene copolymer (EPDM), a styrene-butadiene copolymer rubber (SBR), a silicone rubber, a urethane rubber, an isoprene rubber (IR), a butyl rubber, an acrylonitrile-butadiene copolymer rubber (NBR), a chloroprene rubber (CR), and an epichlorohydrin rubber; and a polyolefin-based thermoplastic elastomer, a urethane-based thermoplastic elastomer, a polystyrene-based thermoplastic elastomer, a fluororubber-based thermoplastic elastomer, a polyester-based thermoplastic elastomer, a polyamide-based thermoplastic elastomer, a polybutadiene-based thermoplastic elastomer, an ethylene-vinyl acetate-based thermoplastic elastomer, a polyvinyl chloride-based thermoplastic elastomer, and a chlorinated polyethylene-based thermoplastic elastomer. Of those, in particular, a (meth)acrylic resin, a styrene resin, a urethane resin, a fluororesin, or a silicone resin is preferred.

Those materials for forming the surface layer may be dispersed with a hitherto known dispersing device using beads, such as a sand mill, a paint shaker, a dyno mill, or a pearl mill. A method of applying the resultant dispersion liquid is not particularly limited, but a dipping method is preferred because its operation is simple.

<Electrophotographic Image Forming Apparatus>

Figure 6:
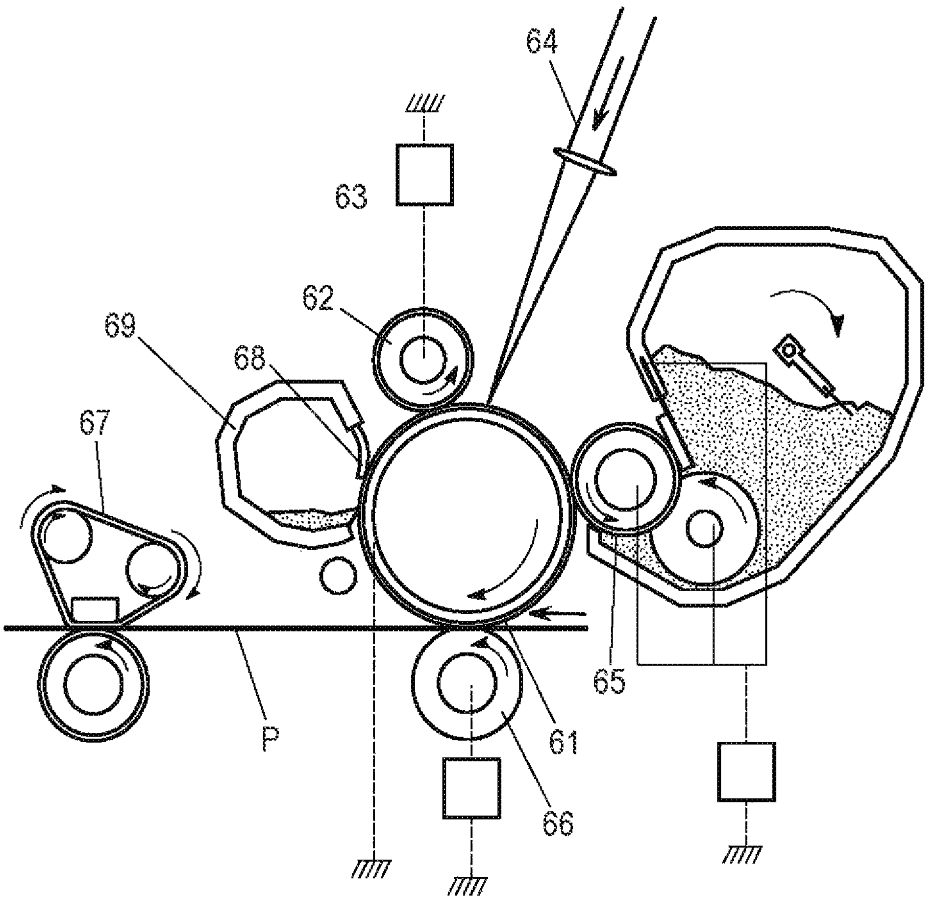
FIG. 6 is a schematic sectional view of an example of an image forming apparatus according to one embodiment of the present disclosure.

A schematic configuration of an example of an electrophotographic image forming apparatus including an electrophotographic member according to one embodiment of the present disclosure is illustrated in FIG. 6.

In FIG. 6, the image forming apparatus includes a photosensitive member 61, a charging device, a latent image forming device, a developing device, a transfer device, a cleaning device, and a fixing device.

The photosensitive member 61 is a rotary drum having a photosensitive layer on an electroconductive substrate. The photosensitive member 61 is driven to rotate in a direction indicated by the arrow at a predetermined peripheral speed (process speed).

The charging device has a function of charging the photosensitive member 61, and includes a charging roller 62 of a contact type that is arranged in contact with the photosensitive member 61 by being brought into abutment thereagainst with a predetermined pressing force. The charging roller 62 is rotated in a direction indicated by the arrow in accordance with the rotation of the photosensitive member 61. The charging roller 62 charges the photosensitive member 61 to a predetermined potential by applying a predetermined DC voltage thereto from a power source 63 for charging.

The latent image forming device (not shown) performs exposure to form an electrostatic latent image on the photosensitive member 61. An exposure device such as a laser beam scanner is used as the latent image forming device. The latent image forming device forms an electrostatic latent image by irradiating the uniformly charged photosensitive member 61 with exposure light 64 corresponding to image information.

The developing device has a function of developing a toner image, and includes a developing roller 65 arranged so as to be close to or in contact with the photosensitive member 61. The developing roller 65 develops the electrostatic latent image by reversal development to form a toner image on the photosensitive member 61 through use of toner that has been electrostatically treated to have the same polarity as the charging polarity of the photosensitive member 61.

The transfer device has a function of transferring the developed toner image onto a recording material P, and includes a transfer roller 66 of a contact type. The transfer roller 66 is rotated in a direction indicated by the arrow in accordance with the rotation of the photosensitive member 61, and transfers the toner image from the photosensitive member 61 onto the recording material P such as plain paper. The recording material P is conveyed in a direction indicated by the arrow by a paper feeding system (not shown) including a conveying member.

The cleaning device has a function of collecting transfer residual toner on the photosensitive member 61, and includes a cleaning member 68 of a blade type and a collection container 69. After the toner image has been transferred onto the recording material P, the cleaning device mechanically scrapes off and collects the transfer residual toner remaining on the photosensitive member 61.

Here, the cleaning device may be omitted by adopting a development simultaneous cleaning system in which the transfer residual toner is collected by the developing device.

The fixing device has a function of fixing the toner image, and includes a fixing belt 67 having heated rolls. When the fixing device is rotated in a direction indicated by the arrow, the fixing device fixes the toner image transferred onto the recording material P and delivers the recording material P out of the apparatus.

In the image forming apparatus, the electrophotographic member described above can be suitably used as the charging roller 62 or the developing roller 65.

<Process Cartridge>

Figure 7:
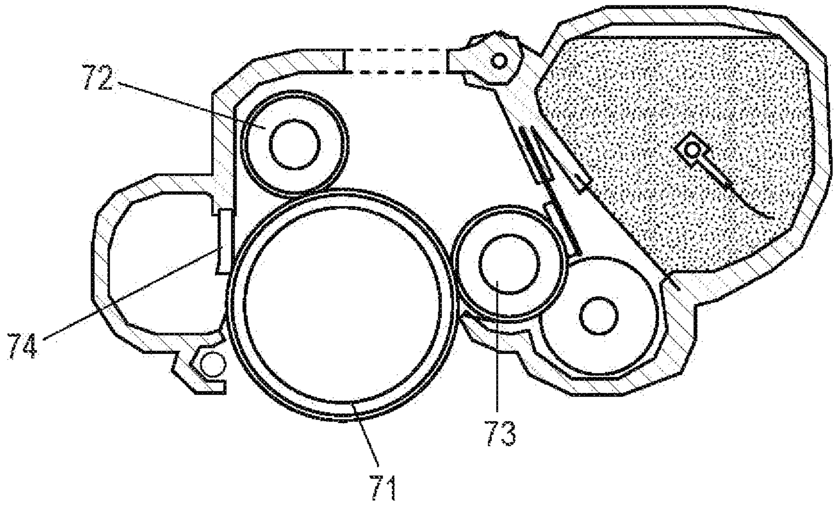
FIG. 7 is a schematic sectional view of an example of a process cartridge according to one embodiment of the present disclosure.

A schematic configuration of one mode of a process cartridge according to one embodiment of the present disclosure is illustrated in FIG. 7. The process cartridge integrates a photosensitive member 71, a charging roller 72, a developing roller 73, and a cleaning member 74, and is detachably attachable to the image forming apparatus. The process cartridge includes the electrophotographic member according to one embodiment of the present disclosure described above, and the electrophotographic member can be suitably used particularly as the charging roller 72 or the developing roller 73.

Examples

One embodiment of the present disclosure is hereinafter described more specifically by way of Examples. However, the present disclosure is not limited to the following Examples.

Example 1

(Production of Mixture for Forming Elastic Layer)

500 ppm of 1,4-diazabicyclo[2.2.2]octane-2-methanol (product name: RZETA, manufactured by Tosoh Corporation) serving as a curing catalyst was added to 20.1 parts by mass of polypropylene glycol (product name: PREMINOL S4013F, manufactured by AGC Inc.), 19.2 parts by mass of polypropylene glycol (product name: UNIOL D-4000, manufactured by NOF Corporation), and 2.5 parts by mass of xylylene diisocyanate (XDI) (manufactured by Tokyo Chemical Industry Co., Ltd.). The mixture was stirred for 4 hours with a closed mixer adjusted to 100° C. to synthesize a polyether having two isocyanate groups.

50.3 Parts by mass of a polycarbonate diol (product name: DURANOL G3452, manufactured by Asahi Kasei Corporation) was mixed with the resultant. After that, the mixture was further stirred for 2 hours with the closed mixer adjusted to 100° C. to synthesize a urethane reactive emulsifier having two hydroxy groups and provide a dispersion in which liquid droplets containing the urethane reactive emulsifier were dispersed in the polycarbonate diol.

To the dispersion, 0.8 part by mass of xylylene diisocyanate (manufactured by Tokyo Chemical Industry Co., Ltd., hereinafter sometimes referred to as "XDI"), 5.2 parts by mass of a polyisocyanate (product name: Millionate MR-200, manufactured by Tosoh Corporation, hereinafter sometimes referred to as "MR-200"), and 1.8 parts by mass of an ion conductive agent (product name: CIL-542, manufactured by Japan Carlit Co., Ltd., hereinafter sometimes referred to as "CIL") were added. The mixture was stirred for 2 minutes with a rotation-revolution type vacuum defoaming mixer under the condition of a revolution speed of 1,600 rpm to provide a mixture for forming an elastic layer.

(Production of Electrophotographic Roller)

A primer (product name: METALOC N-33, manufactured by Toyokagaku Kenkyusho Co., Ltd.) was applied to a mandrel made of SUS304 having a diameter of 6 mm and a length of 250 mm, and was baked at 130° C. for 30 minutes.

Then, the mandrel was placed concentrically in a cylindrical mold having an inner diameter of 11.5 mm, and the mixture for forming an elastic layer was injected into the cylindrical mold preheated to 130° C. over 10 seconds.

After the cylindrical mold had been heated at 130° C. for 1 hour, the mixture was removed from the mold. The resultant was further aged at 80° C. for 2 days to provide an elastic layer. Further, the end portions of the elastic layer were removed. Thus, an electrophotographic roller having a length of 225 mm and an elastic layer thickness of 2.0 mm was obtained. The resultant electrophotographic roller was evaluated as described below.

Method of Evaluating Electrophotographic Roller

Evaluation 1: Recognition and Analysis of Matrix (Sometimes Referred to as "M" in Table 4-1) and Domain (Sometimes Referred to as "D" in Table 4-1)

Slices were produced from the electrophotographic roller with a microtome. Regarding sites for producing slices, when the length of the elastic layer in the longitudinal direction was represented by L, the slices were produced in the thickness direction of the elastic layer at a total of three sites including the center of the elastic layer in the longitudinal direction and two sites of L/4 from both ends of the elastic layer toward the center.

Each of the slices was subjected to mapping measurement with a three-dimensional microscopic laser Raman spectroscopic analyzer (product name: Nanofinder30, manufactured by Tokyo Instruments, Inc.). A measurement mode was set to electron multiplying (EM), and the measurement was performed at 60×60 points at intervals of 500 nm to provide integral images of from 0 $cm^{-1}$ to 400 $cm^{-1}$. From the resultant integral images, a matrix and a plurality of domains dispersed in the matrix were recognized in the elastic layer. In addition, the matrix and the domains were clearly phase-separated.

Next, the Raman spectra of portions of the matrix and the domains were measured from the integral images. The measurement was performed with a light source of Nd:YVO4 (wavelength: 532 nm), a laser intensity of 240 μW, an objective lens at a magnification of 100, a diffraction grating of 300 gr/mm, a pinhole diameter of 100 μm, an exposure time of 30 seconds, and a number of scans of 1. From the resultant Raman spectra, it was recognized that the matrix had a structure derived from polycarbonate urethane and the domain had a structure derived from polypropylene glycol (sometimes referred to as "PPG" in Table 4-1).

Evaluation 2: Measurement of Microrubber Hardness

The microrubber hardness of the elastic layer was measured with a microrubber hardness meter (product name: MD-1capa, manufactured by Kobunshi Keiki Co., Ltd.). In the measurement, the electrophotographic roller was left to stand under an environment at a temperature of 23° C. for 24 hours or more, and the measurement was performed through use of a measuring device placed under the same environment. In addition, a type A indenter (height: 0.50 mm, diameter: 0.16 mm, columnar shape) was used, and a measurement mode was set to a peak hold mode.

When the length of the elastic layer in the longitudinal direction was represented by L, the microrubber hardness was measured at a total of three sites including the center of the elastic layer in the longitudinal direction and two sites of L/4 from both ends of the elastic layer toward the center. An average when the microrubber hardness was measured at each of the measurement sites at a temperature of 23° C. was calculated.

Evaluation 3: Measurement of Parameters Indicating Viscoelastic Terms

Slices were produced from the electrophotographic roller with a microtome. Regarding sites for producing slices, when the length of the elastic layer in the longitudinal direction was represented by L, the slices were produced in the thickness direction of the elastic layer at a total of three sites including the center of the elastic layer in the longitudinal direction and two sites of L/4 from both ends of the elastic layer toward the center.

An arbitrary 50 μm square observation area was selected in a thickness region from the outer surface of each of the slices to a depth of 100 μm, and viscoelastic images were measured with a scanning probe microscope (product name: S-Image, manufactured by SII NanoTechnology) in a total of three observation areas. The measurement mode of the viscoelastic images was set to VE-DFM. In addition, "SI-DF3" (product name, manufactured by Hitachi High-Tech Science Corporation, spring constant=1.9 N/m) was used as a cantilever. Further, a scanning frequency was set to 0.5 Hz.

From the resultant viscoelastic images, parameters each indicating the viscoelastic term in each of the observation areas were calculated at 10 points in each of the matrix and the domains, and from the averages thereof, the parameter A indicating the viscoelastic term of each of the domains and the parameter B indicating the viscoelastic term of the matrix were determined.

Evaluation 4: Measurement of Deformation Recoverability of Elastic Layer

The deformation recoverability of the elastic layer was evaluated in an indentation test with a nanoindenter (product name: HM2000, manufactured by Fischer Instruments K.K.) at a temperature of 23° C. In the measurement, the electrophotographic roller was left to stand under an environment at a temperature of 23° C. for 24 hours or more, and the measurement was performed with a measuring device placed under the same environment.

When the length of the elastic layer in the longitudinal direction was represented by L, the deformation recoverability was measured at a total of three sites including the center of the elastic layer in the longitudinal direction and two sites of L/4 from both ends of the elastic layer toward the center. In the indentation test, a Vickers indenter (square pyramid type, facing angle: 136°) was indented into the elastic layer at a load speed of 10 mN/30 sec and was maintained at a load of 10 mN for 60 seconds. After that, an average when strain after 5 seconds from unloading at the time of unloading was measured at each of the measurement sites was calculated.

Evaluation 5: Elastic Modulus of Matrix

Slices were produced from the electrophotographic roller with a microtome. Regarding sites for producing slices, when the length of the elastic layer in the longitudinal direction was represented by L, the slices were produced in the thickness direction of the elastic layer at a total of three sites including the center of the elastic layer in the longitudinal direction and two sites of L/4 from both ends of the elastic layer toward the center.

An arbitrary 50 μm square observation area was selected in a thickness region from the outer surface of each of the slices to a depth of 100 μm. Phase images were observed with a scanning probe microscope (product name: MFP-3D-Origin, manufactured by Oxford Instruments plc) in a total of three observation areas. The observation mode of the phase images was set to AM-AFM. In addition, "OMCL-AC-160TS" (product name, manufactured by Olympus Corporation, spring constant=47.08 N/m) was used as a cantilever. Further, a scanning frequency was set to 0.5 Hz.

The elastic modulus of the matrix was determined from the resultant phase image by measurement of a force curve with the scanning electron microscope. The measurement mode of the force curve was set to a contact mode, a force distance was set to 500 nm, and a trigger point was set to 0.01 V. In addition, "OMCL-AC-160TS" (product name, manufactured by Olympus Corporation, spring constant=47.08 N/m) was used as a cantilever. Further, a scanning frequency was set to 1 Hz. The elastic modulus of the matrix was determined at 10 points in each of the observation areas, and an average thereof was calculated.

Evaluation 6: Measurement of Sectional Areas and Number of Domains

Slices were produced from the electrophotographic roller with a microtome. Regarding sites for producing slices, when the length of the elastic layer in the longitudinal direction was represented by L, the slices in each of which a cross-section in the total thickness direction of the elastic layer was exposed were produced at a total of three sites including the center of the elastic layer in the longitudinal direction and two sites of L/4 from both ends of the elastic layer toward the center.

A square observation area with one side being 50 μm was set at an arbitrary position in a thickness region from the outer surface of the elastic layer to a depth of 100 μm of each of the slices. Then, viscoelastic images were measured with a scanning probe microscope (product name: S-Image, manufactured by SII NanoTechnology) in a total of three observation areas.

The measurement mode of the viscoelastic images was set to a microviscoelastic dynamic force mode (viscoelastic dynamic force mode (VE-DFM)). In addition, a microcantilever made of silicon for DFM (SI-DF3, manufactured by Hitachi High-Tech Science Corporation, spring constant=1.9 N/m) was used as a cantilever. Further, a scanning frequency was set to 0.5 Hz.

The resultant sectional image was converted into a 256-gradation monochromatic image with image processing software (product name: ImageProPlus, manufactured by Media Cybernetics, Inc.) Then, binarization is performed to provide a binarized image for analysis. A threshold for the binarization was determined from the brightness distribution of the monochromatic image based on the algorism of Otsu described in IEEE Transactions on SYSTEMS, MAN, AND CYBERNETICS, Vol. SMC-9, No. 1, January 1979, pp. 62-66.

The sectional areas and number of the domains were calculated from the resultant binarized image with the count function of the image processing software. Of those determined to be domains with the count function, domains each having a sectional area of less than 0.05% with respect to the 50 μm square observation area were regarded as domains caused by noise and deleted from the data. In addition, the ratio (%) of the total of the sectional areas of the domains in each of the observation areas to the area of the observation area was calculated. In addition, of the domains in each of the observation areas, the number of the domains each having a sectional area of 0.1% or more and 13.0% or less of the area of the observation area was determined, and the ratio (%) of the determined number of the domains with respect to the total number of the domains in the observation area was determined.

Evaluation 7: Measurement of Circularities and Number of Domains

The circularity of each of the domains was calculated from the binarized image obtained in Evaluation 6 described above with the count function of the image processing software. The domains derived from noise were deleted from the data in the same manner as in Evaluation 6. Then, of the domains in each of the observation areas, the number of the domains each having a circularity of 0.60 or more and 0.95 or less was counted, and the ratio (%) of the counted number of the domains with respect to the total number of the domains in each of the observation areas was calculated.

Evaluation 8: Evaluation of Streak-Like Image Defect

A color laser printer (product name: LBP7700C, manufactured by Canon Inc.) and a process cartridge in which an electrophotographic roller was incorporated as a developing roller were left to stand under an environment having a temperature of 23° C. and a humidity of 50% RH for 24 hours, and then image evaluation was performed.

Specifically, the process cartridge in which an electrophotographic roller was incorporated as a developing roller was mounted on the color laser printer. Then, a halftone image (image in which horizontal lines each having a width of 1 dot and an interval of 2 dots were drawn in a direction perpendicular to the rotation direction of a photosensitive member) was continuously output on 10 sheets, and the resultant images were visually observed, and a streak-like image defect was determined based on the following two criteria.

Evaluation 8-1 of Streak-Like Image Defect

Rank A: No streak-like image defect is recognized from the first sheet.

Rank B: A streak-like image defect is recognized only on the first sheet.

Rank C: A streak-like image defect is recognized also on the second and subsequent sheets.

Evaluation 8-2 of Streak-Like Image Defect

Rank A: No streak-like image defect is recognized in the entire longitudinal direction of the electrophotographic roller.

Rank B: A streak-like image defect is recognized in part of a region in the longitudinal direction of the electrophotographic roller.

Rank C: A streak-like image defect is recognized in a wide range in the longitudinal direction of the electrophotographic roller and is conspicuous.

Evaluation 9: Evaluation of Abrasion of End Portion, Melt-Adhesion of Toner, and Image Defect Derived from Melt-Adhesion of Toner The above-mentioned color laser printer and process cartridge in which an electrophotographic roller was incorporated as a developing roller were left to stand under an environment having a temperature of 23° C. and a humidity of 50% RH for 24 hours.

After that, the electrophotographic roller was mounted as a developing roller on the color laser printer, and an image in which horizontal lines each having a width of 2 dots and an interval of 50 dots were drawn was continuously output on 10,000 sheets.

During the continuous output on 10,000 sheets, the developing roller was taken out every 1,000 sheets, and the developing roller was visually observed. The abrasion of the end portion of the developing roller and the melt-adhesion of toner were determined based on the following criteria.

Evaluation 9-1: Evaluation of Abrasion of End Portion

Rank A: Abrasion of the end portion is not recognized even after the output on 10,000 sheets.

Rank B: Abrasion of the end portion is not recognized after the output on 8,000 sheets, but is recognized after the output on 9,000 sheets.

Rank C: Abrasion of the end portion is not recognized after the output on 5,000 sheets, but is recognized after the output on 8,000 sheets.

Rank D: Abrasion of the end portion is recognized after the output on 5,000 sheets.

Evaluation 9-2: Evaluation of Melt-Adhesion of Toner

Rank A: Melt-adhesion of the toner is not recognized even after the output on 10,000 sheets.

Rank B: Melt-adhesion of the toner is not recognized after the output on 8,000 sheets, but is recognized after the output on 9,000 sheets.

Rank C: Melt-adhesion of the toner is not recognized after the output on 5,000 sheets, but is recognized after the output on 8,000 sheets.

Rank D: Melt-adhesion of the toner is recognized after the output on 5,000 sheets.

Evaluation 9-3: Evaluation of Image Defect Derived from Melt-Adhesion of Toner

During the continuous output on 10,000 sheets, the output images were recognized every 10 sheets. When there was an image defect, such as the transfer of toner onto the paper at intervals of one rotation of the electrophotographic roller in a portion other than the horizontal lines, the output was temporarily stopped, and the electrophotographic roller was taken out from the process cartridge. When the position at which the image defect occurred and the site and size of the fused portion of the toner on the electrophotographic roller were matched with each other, the number of output sheets at the time of the temporary stop was taken as the number of sheets of occurrence of an image defect derived from the melt-adhesion of the toner.

Examples 2 to 7, 9 to 12, 14, 15, and 18

Mixtures for forming elastic layers were prepared in the same manner as in Example 1 except that materials shown in Table 3 were used in blending amounts shown in Table 3. Electrophotographic rollers according to Examples were produced by forming elastic layers in the same manner as in Example 1 except that the mixtures for forming elastic layers were used. The resultant electrophotographic rollers were evaluated in the same manner as in Example 1.

The details of material kinds in Table 3 were shown in Table 1 and Table 2. The same applies to the following Examples.

Example 8

A mixture for forming an elastic layer was prepared in the same manner as in Example 1 except that materials shown in Table 3 were used in blending amounts shown in Table 3. An electrophotographic roller according to this Example was produced by forming an elastic layer in the same manner as in Example 1 except that the mixture for forming an elastic layer was used and the injection of the mixture for forming an elastic layer into a cylindrical mold was performed for 5 seconds. The resultant electrophotographic roller was evaluated in the same manner as in Example 1.

Examples 13, 16, and 17

Mixtures for forming elastic layers were prepared in the same manner as in Example 1 except that materials shown in Table 3 were used in blending amounts shown in Table 3. Electrophotographic rollers according to Examples were produced by forming elastic layers in the same manner as in Example 1 except that the mixtures for forming elastic layers were used and the injection of the mixture for forming an elastic layer into a cylindrical mold was performed for 3 seconds. The resultant electrophotographic rollers were evaluated in the same manner as in Example 1.

TABLE 1

| No. | Material A | Carbon number of $R_2$ in general formula (2) | Mn |
|---|---|---|---|
| A1 | Polypropylene glycol “PREMINOL S4013F” (product name, manufactured by AGC Inc.) | 4 (branched) | 12,000 |
| A2 | Polypropylene glycol “UNIOL D-4000” (product name, manufactured by NOF Corporation) | 4 (branched) | 4,000 |
| A3 | Polypropylene glycol “UNIOL D-2000” (product name, manufactured by NOF Corporation) | 4 (branched) | 2,000 |

TABLE 1-continued

| No. | Material A | Carbon number of $R_2$ in general formula (2) | Mn |
|---|---|---|---|
| A4 | Polytetramethylene glycol "PTMG2000" (product name, manufactured by Mitsubishi Chemical Corporation) | 4 (linear) | 2,000 |
| A5 | Tetrahydrofuran-neopentyl glycol copolymer "PTXG-1800" (product name, manufactured by Asahi Kasei Corporation) | 4 (linear) + 5 (branched) | 1,800 |

The tetrahydrofuran-neopentyl glycol copolymer in the above-mentioned item A5 is a polyether glycol represented by the structural formula: HO—$(CH_2CH_2CH_2CH_2O)_m$—$(CH_2C(CH_3)_2CH_2O)_n$—.

TABLE 2

| No. | Material B | Carbon number of $R_1$ in general formula (2) | Mn |
|---|---|---|---|
| B1 | Polycarbonate diol "DURANOL G3452" (product name, manufactured by Asahi Kasei Corporation) | 3 (linear) + 4 (branched) | 2,000 |
| B2 | Polycarbonate polyol "KURARAY POLYOL C-2090" (product name, manufactured by Kuraray Co., Ltd.) | 6 (linear) + 6 (branched) | 2,000 |
| B3 | Polycarbonate polyol "KURARAY POLYOL C-2065N" (product name, manufactured by Kuraray Co., Ltd.) | 9 (linear) + 9 (branched) | 2,000 |
| B4 | Polycarbonate diol "DURANOL T6002" (product name, manufactured by Asahi Kasei Corporation) | 6 (linear) | 2,000 |
| B5 | Polyester polyol "KURARAY POLYOL P-2050" (product name, manufactured by Kuraray Co., Ltd.) | — | 2,000 |

KURARAY POLYOL C-2090 according to the above-mentioned item B2 (polycarbonate polyol manufactured by Kuraray Co., Ltd.; number average molecular weight: 1,993; hydroxyl value: 56.3 mgKOH/g) is a polycarbonate polyol having a 1,6-hexanediol-derived structure and a 3-methyl-1,5-pentanediol-derived structure.

TABLE 3

| | | Material A | | Material A | | Material B | | XDI | | |
|---|---|---|---|---|---|---|---|---|---|---|
| | | Kind | Parts by mass | Kind | Parts by mass | Kind | Parts by mass | Parts by mass | MR-200 Parts by mass | CIL-542 Parts by mass |
| Example | 1 | A1 | 20.1 | A2 | 19.2 | B1 | 50.3 | 3.3 | 5.2 | 1.8 |
| | 2 | A2 | 6.2 | A3 | 5.3 | B3 | 75.3 | 4.4 | 7.0 | 1.8 |
| | 3 | A2 | 19.8 | A3 | 18.9 | B3 | 49.5 | 5.5 | 4.5 | 1.8 |
| | 4 | A2 | 25.1 | — | — | B2 | 62.7 | 4.0 | 6.4 | 1.8 |
| | 5 | A5 | 24.7 | — | — | B2 | 61.7 | 5.2 | 6.6 | 1.8 |
| | 6 | A1 | 20.1 | A2 | 19.1 | B2 | 50.1 | 3.4 | 5.4 | 1.8 |
| | 7 | A2 | 6.2 | A3 | 5.3 | B2 | 75.2 | 4.5 | 7.0 | 1.8 |
| | 8 | A2 | 25.1 | — | — | B2 | 62.7 | 3.9 | 6.4 | 1.8 |
| | 9 | A2 | 25.0 | — | — | B5 | 62.6 | 3.9 | 6.6 | 1.8 |
| | 10 | A4 | 24.7 | — | — | B2 | 61.7 | 5.0 | 6.8 | 1.8 |
| | 11 | A2 | 25.1 | — | — | B4 | 62.6 | 4.0 | 6.5 | 1.8 |
| | 12 | A1 | 44.3 | — | — | B2 | 46.2 | 3.0 | 4.7 | 1.8 |
| | 13 | A2 | 25.1 | — | — | B2 | 62.7 | 3.9 | 6.4 | 1.8 |
| | 14 | A1 | 44.2 | — | — | B5 | 46.1 | 3.1 | 4.8 | 1.8 |
| | 15 | A3 | 7.0 | — | — | B4 | 79.2 | 4.7 | 7.4 | 1.8 |
| | 16 | A1 | 44.2 | — | — | B5 | 46.1 | 3.1 | 4.8 | 1.8 |
| | 17 | A3 | 7.0 | — | — | B4 | 79.2 | 4.7 | 7.4 | 1.8 |
| | 18 | A3 | 7.0 | — | — | B4 | 78.9 | 3.8 | 8.6 | 1.8 |

Comparative Example 1

(Production of Mixture for Forming Elastic Layer)

500 ppm of a curing catalyst (product name: RZETA, manufactured by Tosoh Corporation) was added to 24.9 parts by mass of polypropylene glycol (product name: PREMINOL S4013F, manufactured by AGC Inc.), 24.0 parts by mass of polypropylene glycol (product name: UNIOL D-4000, manufactured by NOF Corporation), and 3.1 parts by mass of xylylene diisocyanate (XDI) (manufactured by Tokyo Chemical Industry Co., Ltd.). The mixture was stirred for 4 hours with a closed mixer adjusted to 100° C. to synthesize a polyether having two isocyanate groups.

41.5 Parts by mass of a polycarbonate diol (DURANOL G3452, manufactured by Asahi Kasei Corporation) was mixed with the resultant. After that, the mixture was further stirred for 2 hours with the closed mixer adjusted to 100° C. to synthesize a urethane reactive emulsifier having two hydroxy groups and provide a dispersion in which liquid droplets containing the urethane reactive emulsifier were dispersed in the polycarbonate diol.

To the dispersion, 4.7 parts by mass of a polyisocyanate (product name: Millionate MR-200, manufactured by Tosoh Corporation) and 1.8 parts by mass of an ion conductive agent (product name: CIL-542, manufactured by Japan Carlit Co., Ltd.) were added. The mixture was stirred for 2 minutes with a rotation-revolution type vacuum defoaming mixer under the condition of a revolution speed of 1,600 rpm to provide a mixture for forming an elastic layer. An electrophotographic roller according to this Comparative Example was obtained in the same manner as in Example 1 except that the mixture for forming an elastic layer thus obtained was used. The resultant electrophotographic roller was evaluated in the same manner as in Example 1.

Regarding the results of Evaluation 1, the matrix and the domains were clearly phase-separated. In addition, it was recognized that the matrix contained a polyurethane elastomer including a polyether, and the domain contained a polyurethane elastomer including a polycarbonate. That is, the relationship between the domains and the matrix was reversed from that of the polyurethane elastomer according to Example 1.

Comparative Example 2

(Production of Mixture for Forming Elastic Layer)

500 ppm of a curing catalyst (product name: RZETA, manufactured by Tosoh Corporation) was added to 20.1 parts by mass of polypropylene glycol (product name: PREMINOL S4013F, manufactured by AGC Inc.), 19.2 parts by mass of polypropylene glycol (product name: UNIOL D-4000, manufactured by NOF Corporation), and 50.3 parts by mass of a polycarbonate diol (product name: DURANOL G3452, manufactured by Asahi Kasei Corporation). The mixture was stirred for 2 hours with a closed mixer adjusted to 100° C. To the mixture, 3.3 parts by mass of xylylene diisocyanate (XDI) (manufactured by Tokyo Chemical Industry Co., Ltd.), 5.2 parts by mass of a polyisocyanate (product name: Millionate MR-200, manufactured by Tosoh Corporation), and 1.8 parts by mass of an ion conductive agent (product name: CIL-542, manufactured by Japan Carlit Co., Ltd.) were added. The resultant mixture was stirred for 2 minutes with a closed vacuum mixer to provide a mixture for forming an elastic layer.

An electrophotographic roller according to this Comparative Example was produced by forming an elastic layer in the same manner as in Example 1 except that the resultant mixture for forming an elastic layer was used. The resultant electrophotographic roller was evaluated in the same manner as in Example 1.

Comparative Example 3

(Production of Mixture for Forming Elastic Layer)

500 ppm of a curing catalyst (product name: RZETA, manufactured by Tosoh Corporation) was added to 7.0 parts by mass of polypropylene glycol (product name: UNIOL D-2000, manufactured by NOF Corporation) and 79.0 parts by mass of a polycarbonate diol (DURANOL T6002, manufactured by Asahi Kasei Corporation). The mixture was stirred for 2 hours with a closed mixer adjusted to 100° C.

To the mixture, 4.3 parts by mass of xylylene diisocyanate (XDI) (manufactured by Tokyo Chemical Industry Co., Ltd.), 8.0 parts by mass of a polyisocyanate (product name: Millionate MR-200, manufactured by Tosoh Corporation), and 1.8 parts by mass of an ion conductive agent (product name: CIL-542, manufactured by Japan Carlit Co., Ltd.) were added. The resultant mixture was stirred for 2 minutes with a closed vacuum mixer to provide a mixture for forming an elastic layer.

An electrophotographic roller according to this Comparative Example was produced by forming an elastic layer in the same manner as in Example 1 except that the resultant mixture for forming an elastic layer was used. The resultant electrophotographic roller was evaluated in the same manner as in Example 1.

Comparative Example 4

(Production of Mixture for Forming Elastic Layer)

500 ppm of a curing catalyst (product name: RZETA, manufactured by Tosoh Corporation) was added to 46.7 parts by mass of a polycarbonate diol (product name: KURARAY POLYOL C-2090, manufactured by Kuraray Co., Ltd.) and 44.8 parts by mass of silicone particles (product name: KMP-598, manufactured by Shin-Etsu Chemical Co., Ltd.) which were flexible resin particles. The mixture was stirred for 4 hours with a closed vacuum mixer adjusted to 100° C.

To the mixture, 2.6 parts by mass of xylylene diisocyanate (XDI) (manufactured by Tokyo Chemical Industry Co., Ltd.), 84.2 parts by mass of a polyisocyanate (product name: Millionate MR-200, manufactured by Tosoh Corporation), and 1.8 parts by mass of an ion conductive agent (product name: CIL-542, manufactured by Japan Carlit Co., Ltd.) were added. The resultant mixture was stirred for 2 minutes with a rotation-revolution type vacuum defoaming mixer under the condition of a revolution speed of 1,600 rpm to provide a mixture for forming an elastic layer.

An electrophotographic roller according to this Comparative Example was produced by forming an elastic layer in the same manner as in Example 1 except that the resultant mixture for forming an elastic layer was used. The resultant electrophotographic roller was evaluated in the same manner as in Example 1. In the evaluation of the electrophotographic roller according to this Comparative Example, the evaluation was performed by regarding the silicone particles as domains.

The evaluation results of Examples 1 to 18 and Comparative Examples 1 to 4 are shown in Table 4-1 to Table 4-4 and Table 5.

TABLE 4-1

| | Evaluation 1 Recognition and analysis of matrix and domain | Evaluation 2 Microrubber hardness | Evaluation 3 Parameter A (mV) | Evaluation 3 Parameter B (mV) | Evaluation 4 Strain (μm) | Evaluation 5 Elastic modulus of matrix (MPa) |
|---|---|---|---|---|---|---|
| Example 1 | Clear phase separation between M and D<br>M: Structure derived from polycarbonate urethane<br>D: Structure derived from PPG | 22 | 60 | 150 | 1.0 | 2 |
| Example 2 | Same as above | 38 | 100 | 250 | 0.3 | 8 |
| Example 3 | Same as above | 35 | 100 | 250 | 0.4 | 8 |
| Example 4 | Same as above | 30 | 80 | 210 | 0.5 | 5 |
| Example 5 | Clear phase separation between M and D<br>M: Structure derived from polycarbonate urethane<br>D: Structure derived from tetrahydrofuran-neopentyl glycol copolymer | 30 | 85 | 210 | 0.5 | 5 |

TABLE 4-1-continued

| | | | | | | |
|---|---|---|---|---|---|---|
| Example 6 | Clear phase separation between M and D<br>M: Structure derived from polycarbonate urethane<br>D: Structure derived from PPG | 25 | 60 | 210 | 0.6 | 5 |

| | Evaluation 6 | | | Evaluation 7 | |
|---|---|---|---|---|---|
| | Total of sectional areas of domains (%) | Average sectional area of domains (%) | Ratio (%) of number of domains each having sectional area of from 0.1% to 13.0% | Average circularity of domains | Ratio (%) of number of domains each having circularity of from 0.60 to 0.95 |
| Example 1 | 45 | 13.0 | 70 | 0.95 | 90 |
| | 45 | 13.0 | 70 | 0.95 | 90 |
| | 45 | 13.0 | 70 | 0.95 | 90 |
| Example 2 | 15 | 0.1 | 70 | 0.95 | 90 |
| | 15 | 0.1 | 70 | 0.95 | 90 |
| | 15 | 0.1 | 70 | 0.95 | 90 |
| Example 3 | 45 | 0.1 | 70 | 0.95 | 90 |
| | 45 | 0.1 | 70 | 0.95 | 90 |
| | 45 | 0.1 | 70 | 0.95 | 90 |
| Example 4 | 29 | 6.5 | 90 | 0.95 | 90 |
| | 30 | 6.6 | 90 | 0.95 | 90 |
| | 30 | 6.6 | 90 | 0.95 | 90 |
| Example 5 | 30 | 6.0 | 90 | 0.95 | 90 |
| | 30 | 6.0 | 90 | 0.95 | 90 |
| | 31 | 6.1 | 90 | 0.94 | 90 |
| Example 6 | 45 | 13.0 | 70 | 0.95 | 90 |
| | 45 | 13.0 | 70 | 0.95 | 90 |
| | 45 | 13.0 | 70 | 0.95 | 90 |

TABLE 4-2

| | Evaluation 1<br>Recognition and analysis of matrix and domain | Evaluation 2<br>Microrubber hardness | Evaluation 3<br>Parameter A (mV) | Evaluation 3<br>Parameter B (mV) | Evaluation 4<br>Strain (μm) | Evaluation 5<br>Elastic modulus of matrix (MPa) |
|---|---|---|---|---|---|---|
| Example 7 | Clear phase separation between M and D<br>M: Structure derived from polycarbonate urethane<br>D: Structure derived from PPG | 35 | 100 | 210 | 0.4 | 5 |
| Example 8 | Same as above | 30 | 80 | 210 | 0.5 | 5 |
| Example 9 | Clear phase separation between M and D<br>M: Structure derived from polyester urethane<br>D: Structure derived from PPG | 21 | 80 | 130 | 1.0 | 1 |
| Example 10 | Clear phase separation between M and D<br>M: Structure derived from polycarbonate urethane<br>D: Structure derived from polytetramethylene glycol | 21 | 80 | 130 | 1.0 | 1 |
| Example 11 | Clear phase separation between M and D<br>M: Structure derived from polycarbonate urethane<br>D: Structure derived from PPG | 39 | 80 | 280 | 0.3 | 10 |
| Example 12 | Same as above | 21 | 40 | 210 | 0.7 | 5 |

TABLE 4-2-continued

| | Evaluation 6 | | | Evaluation 7 | |
|---|---|---|---|---|---|
| | Total of sectional areas of domains (%) | domains (%) Average sectional area of | Ratio (%) of number of domains each having sectional area of from 0.1% to 13.0% | Average circularity of domains | Ratio (%) of number of domains each having circularity of from 0.60 to 0.95 |
| Example 7 | 15 | 0.1 | 70 | 0.95 | 90 |
| | 15 | 0.1 | 70 | 0.95 | 90 |
| | 15 | 0.1 | 70 | 0.95 | 90 |
| Example 8 | 30 | 6.6 | 90 | 0.60 | 70 |
| | 30 | 6.6 | 90 | 0.60 | 70 |
| | 31 | 6.7 | 90 | 0.61 | 71 |
| Example 9 | 29 | 6.5 | 90 | 0.95 | 90 |
| | 30 | 6.6 | 90 | 0.95 | 90 |
| | 30 | 6.6 | 90 | 0.95 | 90 |
| Example 10 | 30 | 6.6 | 90 | 0.95 | 90 |
| | 30 | 6.6 | 90 | 0.95 | 90 |
| | 30 | 6.6 | 90 | 0.95 | 90 |
| Example 11 | 30 | 6.6 | 90 | 0.95 | 90 |
| | 30 | 6.6 | 90 | 0.95 | 90 |
| | 29 | 6.6 | 90 | 0.95 | 90 |
| Example 12 | 50 | 15.0 | 60 | 0.95 | 90 |
| | 51 | 15.1 | 59 | 0.95 | 90 |
| | 50 | 15.0 | 60 | 0.95 | 90 |

TABLE 4-3

| | Evaluation 1 Recognition and analysis of matrix and domain | Evaluation 2 Microrubber hardness | Evaluation 3 Parameter A (mV) | Evaluation 3 Parameter B (mV) | Evaluation 4 Strain (μm) | Evaluation 5 Elastic modulus of matrix (MPa) |
|---|---|---|---|---|---|---|
| Example 13 | Clear phase separation between M and D<br>M: Structure derived from polycarbonate urethane<br>D: Structure derived from PPG | 30 | 80 | 210 | 0.5 | 5 |
| Example 14 | Clear phase separation between M and D<br>M: Structure derived from polyester urethane<br>D: Structure derived from PPG | 20 | 40 | 130 | 1.0 | 1 |
| Example 15 | Clear phase separation between M and D<br>M: Structure derived from polycarbonate urethane<br>D: Structure derived from PPG | 40 | 140 | 280 | 0.1 | 10 |
| Example 16 | Clear phase separation between M and D<br>M: Structure derived from polyester urethane<br>D: Structure derived from PPG | 20 | 40 | 130 | 1.0 | 1 |
| Example 17 | Clear phase separation between M and D<br>M: Structure derived from polycarbonate urethane<br>D: Structure derived from PPG | 40 | 140 | 280 | 0.1 | 10 |
| Example 18 | Same as above | 50 | 140 | 310 | 0.05 | 13 |

| | Evaluation 6 | | | Evaluation 7 | |
|---|---|---|---|---|---|
| | Total of sectional areas of domains (%) | Average sectional area of domains (%) | Ratio (%) of number of domains each having sectional area of from 0.1% to 13.0% | Average circularity of domains | Ratio (%) of number of domains each having circularity of from 0.60 to 0.95 |
| Example 13 | 30 | 6.6 | 90 | 0.50 | 60 |
| | 30 | 6.6 | 90 | 0.50 | 60 |
| | 30 | 6.6 | 90 | 0.50 | 60 |

TABLE 4-3-continued

| | | | | | |
|---|---|---|---|---|---|
| Example 14 | 49 | 14.9 | 61 | 0.95 | 90 |
| | 50 | 15.0 | 60 | 0.95 | 90 |
| | 50 | 15.0 | 60 | 0.95 | 90 |
| Example 15 | 9 | 0.04 | 60 | 0.95 | 90 |
| | 10 | 0.05 | 60 | 0.95 | 90 |
| | 10 | 0.05 | 60 | 0.95 | 90 |
| Example 16 | 50 | 15.0 | 60 | 0.50 | 60 |
| | 50 | 15.0 | 60 | 0.50 | 60 |
| | 50 | 15.0 | 60 | 0.50 | 60 |
| Example 17 | 10 | 0.05 | 60 | 0.50 | 60 |
| | 10 | 0.05 | 60 | 0.50 | 60 |
| | 11 | 0.06 | 60 | 0.50 | 60 |
| Example 18 | 10 | 0.05 | 60 | 0.95 | 90 |
| | 10 | 0.05 | 60 | 0.95 | 90 |
| | 10 | 0.05 | 60 | 0.95 | 90 |

TABLE 4-4

| | Evaluation 1 Recognition and analysis of matrix and domain | Evaluation 2 Microrubber hardness | Evaluation 3 Parameter A (mV) | Evaluation 3 Parameter B (mV) | Evaluation 4 Strain (μm) | Evaluation 5 Elastic modulus of matrix (MPa) |
|---|---|---|---|---|---|---|
| Comparative Example 1 | Clear phase separation between M and D M: Structure derived from polycarbonate urethane D: Structure derived from PPG | 16 | 150 | 60 | 5.0 | 0.6 |
| Comparative Example 2 | Clear phase separation between M and D M: Structure derived from polycarbonate urethane D: Structure derived from PPG | 18 | 80 | 120 | 3.0 | 0.8 |
| Comparative Example 3 | Clear phase separation between M and D M: Structure derived from polycarbonate urethane D: Structure derived from PPG | 42 | 160 | 290 | 2.0 | 0.9 |
| Comparative Example 4 | Clear phase separation between M and D M: Structure derived from polycarbonate urethane D: Silicone | 60 | 220 | 310 | 0.05 | 13 |

| | Evaluation 6 | | | Evaluation 7 | |
|---|---|---|---|---|---|
| | Total of sectional areas of domains (%) | Average sectional area of domains (%) | Ratio (%) of number of domains each having sectional area of from 0.1% to 13.0% | Average circularity of domains | Ratio (%) of number of domains each having circularity of from 0.60 to 0.95 |
| Comparative Example 1 | 45 | 0.05 | 60 | 0.95 | 90 |
| | 45 | 0.05 | 60 | 0.95 | 90 |
| | 45 | 0.05 | 60 | 0.95 | 90 |
| Comparative Example 2 | 45 | 13.0 | 70 | 0.50 | 60 |
| | 45 | 13.0 | 70 | 0.50 | 60 |
| | 45 | 13.0 | 70 | 0.50 | 60 |
| Comparative Example 3 | 10 | 0.05 | 60 | 0.50 | 60 |
| | 10 | 0.05 | 60 | 0.50 | 60 |
| | 9 | 0.04 | 60 | 0.50 | 60 |
| Comparative Example 4 | 50 | 5.3 | 90 | 0.95 | 90 |
| | 50 | 5.3 | 90 | 0.95 | 90 |
| | 51 | 5.4 | 90 | 0.95 | 90 |

TABLE 5

| | | Evaluation 8 | | Evaluation 9-1 Evaluation rank of abrasion of | Evaluation 9-2 Evaluation rank of melt-adhesion of | Evaluation 9-3 Image defect derived from melt-adhesion |
|---|---|---|---|---|---|---|
| | | 8-1 | 8-2 | end portion | toner | of toner |
| Example | 1 | A | A | A | A | No occurrence |
| | 2 | A | A | A | A | No occurrence |
| | 3 | A | A | A | A | No occurrence |
| | 4 | A | A | A | A | No occurrence |
| | 5 | A | A | A | A | No occurrence |
| | 6 | A | A | A | A | No occurrence |
| | 7 | A | A | A | A | No occurrence |
| | 8 | A | A | A | A | No occurrence |
| | 9 | B | A | B | A | No occurrence |
| | 10 | B | A | B | A | No occurrence |
| | 11 | A | A | A | B | No occurrence |
| | 12 | B | A | B | A | No occurrence |
| | 13 | B | B | A | A | No occurrence |
| | 14 | B | A | C | A | No occurrence |
| | 15 | A | A | A | C | No occurrence |
| | 16 | B | B | C | A | No occurrence |
| | 17 | B | B | A | C | No occurrence |
| | 18 | A | A | A | C | No occurrence |
| Comparative Example | 1 | C | A | D | A | No occurrence |
| | 2 | C | C | D | A | No occurrence |
| | 3 | C | C | A | C | Occurred on 8,410 sheets |
| | 4 | A | A | A | D | Occurred on 5,550 sheets |

In each of the electrophotographic rollers according to Examples 1 to 18, the microrubber hardness of the elastic layer was low, and the plurality of domains were dispersed in the matrix containing the polyurethane elastomer. In addition, the parameter B indicating the viscoelastic term of the matrix was larger than the parameter A indicating the viscoelastic term of each of the domains, and the strain after unloading in the indentation test with a nanoindenter was small. Thus, satisfactory results were obtained in the evaluation of a streak-like image defect. In addition, although the melt-adhesion of toner was observed in some of the electrophotographic rollers, no image defect derived from the melt-adhesion of toner occurred until the image was output on 10,000 sheets.

Meanwhile, in the electrophotographic roller according to Comparative Example 1, the parameter A indicating the viscoelastic term of each of the domains was larger than the parameter B indicating the viscoelastic term of the matrix. Thus, an excess decrease in microrubber hardness and large strain after unloading occurred, and the evaluation of a streak-like image defect was not satisfactory.

In the electrophotographic roller according to Comparative Example 2, a matrix-domain structure was formed by mechanical phase separation without through the polyether and the urethane reactive emulsifier. Thus, the phase separation was unclear. In addition, the circularity of each of the domains was reduced. As a result, an excess decrease in microrubber hardness and large strain after unloading also occurred, and the evaluation of a streak-like image defect was not satisfactory.

Also in the electrophotographic roller according to Comparative Example 3, phase separation was mechanically caused without through the urethane reactive emulsifier in the same manner as in Comparative Example 2. Thus, the phase separation was unclear. In addition, the circularity of each of the domains was also reduced. As a result, the strain after unloading was increased, and the evaluation of a streak-like image defect was not satisfactory. In addition, even after this, the strain was not easily recovered, and toner was stuck to a strain portion and was further fused, to thereby cause an image defect derived from the melt-adhesion of toner on 8,410 sheets. In the electrophotographic roller according to Comparative Example 4, flexible particles were used as the domains. However, to maintain the shape of each of the particles, the parameter A indicating the viscoelastic term of each of the domains according to the present disclosure became significantly large, and the parameter B indicating the viscoelastic term of the matrix was required to be increased. As a result, the microhardness was excessively increased to cause the melt-adhesion of toner. In addition, due to the excessively high microrubber hardness, the melt-adhesion of toner further progressed, and an image defect derived from the melt-adhesion of toner occurred on 5,550 sheets.

According to one aspect of the present disclosure, the electrophotographic member that has low hardness and rapidly recovers from deformation can be provided. According to another aspect of the present disclosure, the method of producing an electrophotographic member that has low hardness and rapidly recovers from deformation can be provided. In addition, according to still another aspect of the present disclosure, the process cartridge that contributes to the formation of a high-quality electrophotographic image can be provided. According to yet still another aspect of the present disclosure, the electrophotographic image forming apparatus capable of forming a high-quality electrophotographic image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electrophotographic member, comprising:

a mandrel; and an elastic layer on an outer periphery of the mandrel, the elastic layer having a microrubber hardness of 20 to 50 at a temperature of 23° C.;

the elastic layer containing a polyurethane elastomer including a matrix and a plurality of domains dispersed in the matrix; and A<B, where A indicates a viscoelastic term of each of the plurality of domains and B indicates a viscoelastic term of the matrix, units of A and B are mV, and a larger value thereof indicates higher elasticity, A and B being measured in a viscoelastic image of three cross-sections of the elastic layer in a thickness direction with a scanning probe microscope, wherein in an indentation test of the elastic layer with a nanoindenter at 23° C., in which a Vickers indenter is indented into the elastic layer at a load speed of 10 mN/30 sec and is maintained at a load of 10 mN for 60 seconds, followed by unloading, strain after 5 seconds from the unloading is 1 μm or less, a measurement mode of the viscoelastic image with the scanning probe microscope is a microviscoelastic dynamic force mode in which a surface profile image is obtained while a distance between a probe and a measurement sample is controlled so that a vibration and an amplitude of a cantilever become constant under a state in which the cantilever is resonated, the cantilever comprising silicon having a spring constant of 1.9 N/m, and a scanning frequency is 0.5 Hz, the three cross-sections are obtained in a thickness direction of the elastic layer at a center in a longitudinal direction of the elastic layer and at L/4 from both ends of the elastic layer toward the center, when L is a length of the elastic layer in a longitudinal direction, as an observation area of each of the three cross-sections, an arbitrary 50 μm square observation area is selected in a thickness region from the outer surface of each of the cross sections to a depth of 100 μm, and observation of the viscoelastic image is performed in a total of three observation areas, after the viscoelastic image is acquired, when parameters each indicating the viscoelastic term in each of the three observation areas are determined at 10 points in each of the domain, an average thereof is A, and when parameters each indicating the viscoelastic term in each of the three observation areas are determined at 10 points in each of the matrix, an average thereof is B, and the observation areas each satisfy (1) and (2)

(1) a ratio of a total of sectional areas of the plurality of domains is 15% to 45% of an area of one observation area, and (2) a ratio of a number of the plurality of domains each having a sectional area of 0.1% to 13.0% with respect to each of the observation area is at least 70 number %.

2. The electrophotographic member according to claim 1, wherein the matrix has an elastic modulus of 2 to 8 MPa.

3. An electrophotographic member, comprising:

a mandrel; and an elastic layer on an outer periphery of the mandrel, the elastic layer having a microrubber hardness of 20 to 50 at a temperature of 23° C.;

the elastic layer containing a polyurethane elastomer including a matrix and a plurality of domains dispersed in the matrix; and A<B, where A indicates a viscoelastic term of each of the plurality of domains and B indicates a viscoelastic term of the matrix, units of A and B are mV, and a larger value thereof indicates higher elasticity, A and B being measured in a viscoelastic image of three cross-sections of the elastic layer in a thickness direction with a scanning probe microscope, wherein in an indentation test of the elastic layer with a nanoindenter at 23° C., in which a Vickers indenter is indented into the elastic layer at a load speed of 10 mN/30 sec and is maintained at a load of 10 mN for 60 seconds, followed by unloading, strain after 5 seconds from the unloading is 1 μm or less, a measurement mode of the viscoelastic image with the scanning probe microscope is a microviscoelastic dynamic force mode in which a surface profile image is obtained while a distance between a probe and a measurement sample is controlled so that a vibration and an amplitude of a cantilever become constant under a state in which the cantilever is resonated, the cantilever comprising silicon having a spring constant of 1.9 N/m, and a scanning frequency is 0.5 Hz, the three cross-sections are obtained in a thickness direction of the elastic layer at a center in a longitudinal direction of the elastic layer and at L/4 from both ends of the elastic layer toward the center, when L is a length of the elastic layer in a longitudinal direction, as an observation area of each of the three cross-sections, an arbitrary 50 μm square observation area is selected in a thickness region from the outer surface of each of the cross sections to a depth of 100 μm, and observation of the viscoelastic image is performed in a total of three observation areas, after the viscoelastic image is acquired, when parameters each indicating the viscoelastic term in each of the three observation areas are determined at 10 points in each of the domain, an average thereof is A, and when parameters each indicating the viscoelastic term in each of the three observation areas are determined at 10 points in each of the matrix, an average thereof is B, and each of the observation areas has an observation area ratio of the number of the plurality of domains having a circularity of 0.60 to 0.95 of at least 70 number %.

4. The electrophotographic member according to claim 1, wherein the matrix contains a polyurethane elastomer including a polycarbonate structural unit represented by formula (1) as a repeating structural unit, and each of the plurality of domains includes a polyether structural unit represented by formula (2) as a repeating structural unit General formula (1)

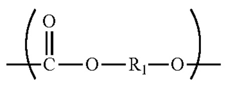

where $R_1$ represents an alkylene group having 3 to 9 carbon atoms, and $R_2$ represents an alkylene group having 3 to 5 carbon atoms.

5. The electrophotographic member according to claim 4, wherein $R_1$ represents an alkylene group having a branched structure that has 3 to 9 carbon atoms.

6. The electrophotographic member according to claim 4, wherein $R_2$ represents an alkylene group having a branched structure that has 3 to 5 carbon atoms.

7. A process cartridge configured to be detachably attachable to an image forming apparatus, the process cartridge comprising an electrophotographic member comprising:

a mandrel; and an elastic layer on an outer periphery of the mandrel, the elastic layer having a microrubber hardness of 20 to 50 at a temperature of 23° C.;

the elastic layer containing a polyurethane elastomer including a matrix and a plurality of domains dispersed in the matrix; and A<B, where A indicates a viscoelastic term of each of the plurality of domains and B indicates a viscoelastic term of the matrix, units of A and B are mV, and a larger value thereof indicates higher elasticity, A and B being measured in a viscoelastic image of three cross-sections of the elastic layer in a thickness direction with a scanning probe microscope, wherein in an indentation test of the elastic layer with a nanoindenter at 23° C., in which a Vickers indenter is indented into the elastic layer at a load speed of 10 mN/30 sec and is maintained at a load of 10 mN for 60 seconds, followed by unloading, strain after 5 seconds from the unloading is 1 μm or less, wherein a measurement mode of the viscoelastic image with the scanning probe microscope is a microviscoelastic dynamic force mode in which a surface profile image is obtained while a distance between a probe and a measurement sample is controlled so that a vibration and an amplitude of a cantilever become constant under a state in which the cantilever is resonated, the cantilever comprising silicon having a spring constant of 1.9 N/m, and a scanning frequency is 0.5 Hz, the three cross-sections are obtained in a thickness direction of the elastic layer at a center in a longitudinal direction of the elastic layer and at L/4 from both ends of the elastic layer toward the center, when L is a length of the elastic layer in a longitudinal direction, as an observation area of each of the three cross-sections, an arbitrary 50 μm square observation area is selected in a thickness region from the outer surface of each of the cross-sections to a depth of 100 μm, and observation of the viscoelastic image is performed in a total of three observation areas, after the viscoelastic image is acquired, when parameters each indicating the viscoelastic term in each of the three observation areas are determined at 10 points in each of the domain, an average thereof is A, and when parameters each indicating the viscoelastic term in each of the three observation areas are determined at 10 points in each of the matrix, an average thereof is B, and the observation areas each satisfy (1) and (2)

(1) a ratio of a total of sectional areas of the plurality of domains is 15% to 45% of an area of one observation area, and (2) a ratio of a number of the plurality of domains each having a sectional area of 0.1% to 13.0% with respect to each of the observation area is at least 70 number %.

8. An electrophotographic image forming apparatus, comprising an electrophotographic member comprising:

a mandrel; and an elastic layer on an outer periphery of the mandrel, the elastic layer having a microrubber hardness of 20 to 50 at a temperature of 23° C.;

the elastic layer containing a polyurethane elastomer including a matrix and a plurality of domains dispersed in the matrix; and A<B, where A indicates a viscoelastic term of each of the plurality of domains and B indicates a viscoelastic term of the matrix, units of A and B are mV, and a larger value thereof indicates higher elasticity, A and B being measured in a viscoelastic image of three cross-sections of the elastic layer in a thickness direction with a scanning probe microscope, wherein in an indentation test of the elastic layer with a nanoindenter at 23° C., in which a Vickers indenter is indented into the elastic layer at a load speed of 10 mN/30 sec and is maintained at a load of 10 mN for 60 seconds, followed by unloading, strain after 5 seconds from the unloading is 1 μm or less, wherein a measurement mode of the viscoelastic image with the scanning probe microscope is a microviscoelastic dynamic force mode in which a surface profile image is obtained while a distance between a probe and a measurement sample is controlled so that a vibration and an amplitude of a cantilever become constant under a state in which the cantilever is resonated, the cantilever comprising silicon having a spring constant of 1.9 N/m, and a scanning frequency is 0.5 Hz, the three cross-sections are obtained in a thickness direction of the elastic layer at a center in a longitudinal direction of the elastic layer and at L/4 from both ends of the elastic layer toward the center, when L is a length of the elastic layer in a longitudinal direction, as an observation area of each of the three cross-sections, an arbitrary 50 μm square observation area is selected in a thickness region from the outer surface of each of the cross-sections to a depth of 100 μm, and observation of the viscoelastic image is performed in a total of three observation areas, after the viscoelastic image is acquired, when parameters each indicating the viscoelastic term in each of the three observation areas are determined at 10 points in each of the domain, an average thereof is A, and when parameters each indicating the viscoelastic term in each of the three observation areas are determined at 10 points in each of the matrix, an average thereof is B, and the observation areas each satisfy (1) and (2)

(1) a ratio of a total of sectional areas of the plurality of domains is 15% to 45% of an area of one observation area, and (2) a ratio of a number of the plurality of domains each having a sectional area of 0.1% to 13.0% with respect to each of the observation area is at least 70 number %.

9. A method of producing an electrophotographic member comprising a mandrel having an elastic layer on an outer periphery of the mandrel, the elastic layer containing a polyurethane elastomer including a matrix and a plurality of domains dispersed in the matrix, the method comprising the steps of:

(i) allowing a first polyether having at least two isocyanate groups and a first polycarbonate polyol having at least two hydroxy groups to react with each other to provide a urethane reactive emulsifier having at least two hydroxy groups;

(ii) providing a dispersion in which liquid droplets each containing at least part of the urethane reactive emulsifier are dispersed in a second polycarbonate polyol;

(iii) mixing the dispersion and a polyisocyanate having at least two isocyanate groups with each other to provide a mixture for forming an elastic layer; and (iv) allowing the urethane reactive emulsifier, the second polycarbonate polyol, and the polyisocyanate in the mixture for forming an elastic layer to react with each other on a surface of the mandrel, to thereby provide the elastic layer, wherein A<B, where A indicates a viscoelastic term of each of the plurality of domains and B indicates a viscoelastic term of the matrix, A and B being measured in a viscoelastic image of three cross-sections of the elastic layer in a thickness direction with a scanning probe microscope, the elastic layer has a microrubber hardness of 20 to 50 at a temperature of 23° C., in an indentation test of the elastic layer with a nanoindenter at 23° C., in which a Vickers indenter is indented into the elastic layer at a load speed of 10 mN/30 sec and is maintained at a load of 10 mN for 60 seconds, followed by unloading, strain after 5 seconds from the unloading is 1 μm or less, a measurement mode of the viscoelastic image with the scanning probe microscope is a microviscoelastic dynamic force mode in which a surface profile image is obtained while a distance between a probe and a measurement sample is controlled so that a vibration and an amplitude of a cantilever become constant under a state in which the cantilever is resonated, the cantilever comprising silicon having a spring constant of 1.9 N/m, and a scanning frequency is 0.5 Hz, the three cross-sections are obtained in a thickness direction of the elastic layer at a center in a longitudinal direction of the elastic layer and at L/4 from both ends of the elastic layer toward the center, when L is a length of the elastic layer in a longitudinal direction, as an observation area of each of the three cross-sections, an arbitrary 50 μm square observation area is selected in a thickness region from the outer surface of each of the cross sections to a depth of 100 μm, and observation of the viscoelastic image is performed in a total of three observation areas, after the viscoelastic image is acquired, when parameters each indicating the viscoelastic term in each of the three observation areas are determined at 10 points in each of the domain, an average thereof is A, and when parameters each indicating the viscoelastic term in each of the three observation areas are determined at 10 points in each of the matrix, an average thereof is B.

10. A method of producing an electrophotographic member according to claim 9, wherein the observation areas each satisfy (1) and (2)

(1) a ratio of a total of sectional areas of the plurality of domains is 15% to 45% of an area of one observation area, and (2) a ratio of a number of the plurality of domains each having a sectional area of 0.1% to 13.0% with respect to each of the observation area is at least 70 number %.

11. A method of producing an electrophotographic member according to claim 9, wherein each of the observation areas has an observation area ratio of the number of the plurality of domains having a circularity of 0.60 to 0.95 of at least 70 number %.

* * * * *